US012671613B2

(12) United States Patent
Cirillo et al.

(10) Patent No.: US 12,671,613 B2
(45) Date of Patent: Jun. 30, 2026

(54) PREAMBLE DETECTION FOR WIRELESS POWER ASK COMMUNICATION

(71) Applicant: STMicroelectronics International N.V., Geneva (CH)

(72) Inventors: Giovanni Amedeo Cirillo, Turin (IT); Gianluca De Piano, Serino (IT); Alessandro Alaimo, Vecchiano (IT)

( * ) Notice: Subject to any disclaimer, the term of this patent is extended or adjusted under 35 U.S.C. 154(b) by 0 days.

(21) Appl. No.: 18/962,539

(22) Filed: Nov. 27, 2024

(65) Prior Publication Data

US 2026/0149630 A1     May 28, 2026

(51) Int. Cl.
H04L 27/06 (2006.01)
H04L 25/03 (2006.01)

(52) U.S. Cl.
CPC ........ H04L 27/06 (2013.01); H04L 25/03261 (2013.01)

(58) Field of Classification Search
CPC ........................... H04L 27/06; H04L 25/03261
USPC ........................................................ 329/347
See application file for complete search history.

(56) References Cited

U.S. PATENT DOCUMENTS

| | | | |
|---|---|---|---|
| 2007/0069864 A1* | 3/2007 | Bae | H04B 5/48 340/10.2 |
| 2018/0351392 A1 | 12/2018 | Malkin | |
| 2022/0247232 A1 | 8/2022 | Schwartz | |
| 2023/0259480 A1 | 8/2023 | Narayana Iyer | |
| 2024/0039423 A1 | 2/2024 | Walley | |
| 2024/0195665 A1 | 6/2024 | Mineo | |

FOREIGN PATENT DOCUMENTS

| | | |
|---|---|---|
| CN | 115348144 A | 11/2022 |
| WO | 2019186184 A1 | 10/2019 |
| WO | 2023170754 A1 | 9/2023 |

* cited by examiner

*Primary Examiner* — Richard Tan
(74) *Attorney, Agent, or Firm* — Slater Matsil, LLP

(57) ABSTRACT

According to an embodiment, a preamble detection circuit includes a slicer that normalizes a demodulated Amplitude Shift Keying (ASK) signal to generate a binary waveform, a correlator that performs correlation with a reference preamble sequence, and decision logic that determines if a valid preamble is detected. The circuit enables a primary demodulation chain to remain in a low-power state until a valid preamble is identified, providing efficient preamble detection for wireless power transfer systems while minimizing power consumption during communication inactivity. The circuit's configurable parameters allow optimization for different operating conditions and communication protocols.

20 Claims, 10 Drawing Sheets

500

100

120

110

1050

1200

1202 — RECEIVE ASK SIGNAL FROM DEMODULATOR CIRCUIT

1204 — NORMALIZE ASK SIGNAL TO GENERATE SQUARE WAVE

1206 — PERFORM MULTI-BIT CORRELATION ON NORMALIZED SQUARE WAVE

1208 — ESTIMATE VARIANCE OF CORRELATED SIGNAL

1210 — ANALYZE VARIANCE ESTIMATOR OUTPUT

1212 — DETERMINE IF VALID PREAMBLE IS DETECTED

PREAMBLE DETECTION FOR WIRELESS POWER ASK COMMUNICATION

TECHNICAL FIELD

The present disclosure generally relates to electronic devices and, in particular embodiments, to preamble detection in Amplitude Shift Keying (ASK) communication for wireless power transfer systems.

BACKGROUND

Wireless power transfer systems have gained significant attention due to their convenience and potential applications in various fields. These systems typically employ inductive coupling between two coils to transfer power from a transmitter to a receiver without physical connections.

A power transmitter can transfer power to a power receiver through electromagnetic induction in wireless power transfer systems. Each of the power transmitter and power receiver includes a coil, referred to as the primary coil in the power transmitter and the secondary coil in the power receiver. When an alternating current flows through the primary coil, it generates a time-varying magnetic field. This magnetic field induces a voltage in the secondary coil, thereby transferring power to the power receiver.

Communication between the power transmitter and receiver is often necessary to optimize power transfer and ensure safe operation. This communication can be achieved through various methods, with Amplitude Shift Keying (ASK) commonly used in many wireless power transfer standards, such as the Qi standard.

In ASK communication for wireless power transfer, the power receiver can communicate with the power transmitter through a method known as backscatter modulation. This technique involves varying the load impedance of the secondary coil, which modulates the current or voltage in the primary coil, which behaves as carrier signals of the modulation. The power transmitter can then detect and interpret these modulations as data.

The Qi standard for wireless power transfer specifies using ASK modulation with biphase-mark coding. In this coding scheme, data is synchronized with a clock signal, typically operating at a frequency of 2 kHz±4%. Each bit period begins with a transition, and the presence or absence of an additional transition midway through the bit period determines whether the bit is a '1' or a '0', respectively.

In Qi-compliant ASK communication, messages typically begin with a preamble. The preamble consists of a sequence of consecutive '1' bits, followed by specific components such as a start bit, data byte, parity bit, and stop bit. The preamble serves several purposes, including allowing the receiver to synchronize with the incoming data stream and indicating the beginning of a communication.

SUMMARY

Technical advantages are generally achieved by embodiments of this disclosure, which describe preamble detection in Amplitude Shift Keying (ASK) communication for wireless power transfer systems.

A first aspect relates to a method for detecting a preamble in an Amplitude Shift Keying (ASK) signal, the method comprising receiving a demodulated ASK signal at a preamble detection circuit; detecting a valid preamble or portions of a valid preamble sequence using the preamble detection circuit, the detecting comprising normalizing the demodulated ASK signal to generate a binary waveform with a configurable amplitude, performing a correlation between the normalized binary waveform and a reference preamble sequence, wherein the correlation is performed for a configurable number of bits, estimating a parameter associated with the correlated signal, and determining whether a valid preamble has been detected based on the estimated parameter; generating a trigger signal based on the detection of the valid preamble or portions of the valid preamble sequence.

A second aspect relates to a circuit for detecting a preamble in an Amplitude Shift Keying (ASK) signal, the circuit comprising a slicer configured to normalize a demodulated ASK signal and generate a binary waveform with a configurable amplitude; a correlator circuit coupled to the slicer and configured to perform a correlation between the normalized binary waveform and a reference preamble sequence, wherein the correlation is performed for a configurable number of bits; an estimator circuit coupled to the correlator circuit and configured to estimate a parameter associated with the correlated signal; and a decision logic circuit coupled to the estimator circuit and configured to determine whether a valid preamble or portions of a valid preamble sequence has been detected based on the estimated parameter and generate a trigger signal in response to determining the valid preamble or portions of valid preamble sequence.

A third aspect relates to a system for Amplitude Shift Keying (ASK) demodulation, the system comprising a primary demodulation chain; and a preamble detection circuit coupled to the primary demodulation chain, the preamble detection circuit comprising a slicer configured to normalize a demodulated ASK signal and generate a binary waveform with a configurable amplitude, a correlator circuit coupled to the slicer and configured to perform a correlation between the normalized binary waveform and a reference preamble sequence, wherein the correlation is performed for a configurable number of bits, an estimator circuit coupled to the correlator circuit and configured to estimate a parameter associated with the correlated signal, and a decision logic circuit coupled to the estimator circuit and configured to determine whether a valid preamble or portions of a valid preamble sequence have been detected based on the estimated parameter, wherein the primary demodulation chain is triggered in response to detecting a valid preamble.

A fourth aspect relates to a system for Amplitude Shift Keying (ASK) demodulation, the system comprising a primary demodulation circuit configured to perform demodulation and decoding operations; an auxiliary demodulation circuit configured to perform demodulation operations without decoding; and a preamble detection circuit coupled to the primary demodulation circuit and the auxiliary demodulation circuit, wherein the system is configurable to operate in a first mode wherein the primary demodulation circuit remains inactive and the auxiliary demodulation circuit performs demodulation operations and provides signals to the preamble detection circuit, and a second mode wherein a demodulation portion of the primary demodulation circuit operates in a low-power state while a decoding portion remains inactive, the demodulation portion providing signals to the preamble detection circuit without the auxiliary demodulation circuit.

A fifth aspect relates to a circuit for wireless power transfer systems, the circuit comprising a demodulation circuit configured to perform ASK signal demodulation and decoding operations, the demodulation circuit having a low-power state and an active state; a preamble detection circuit coupled to receive an ASK signal, the preamble detection circuit comprising a slicer configured to normalize a demodulated ASK signal and generate a binary waveform with a configurable amplitude, a correlator circuit coupled to the slicer and configured to perform a correlation between the normalized binary waveform and a reference preamble sequence, a parameter estimator circuit coupled to the correlator circuit and configured to estimate a parameter associated with the correlated signal, and a decision logic circuit coupled to the parameter estimator circuit and configured to determine whether a valid preamble or portions of a valid preamble sequence has been detected based on the estimated parameter, wherein the preamble detection circuit is configured to operate concurrently with the primary demodulation circuit, maintain the primary demodulation circuit in the low-power state until a valid preamble is detected, and trigger transition of the primary demodulation circuit from the low-power state to the active state upon detection of the valid preamble.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
FIG. 1 is a block diagram of an embodiment wireless power system, which may also be called a wireless charging system.
Figure 1:
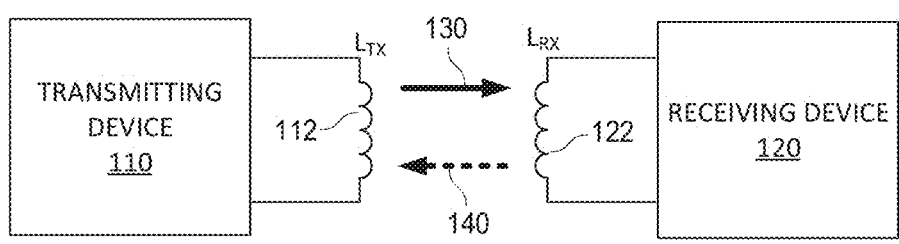

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of wireless power transfer systems using the Qi standard, it should also be appreciated that these inventive aspects may also apply to other wireless communication protocols and standards that utilize preamble detection. In particular, aspects of this disclosure may similarly apply to standard wireless protocols like Bluetooth, WiFi, NFC, or other non-standard wireless protocols that detect a preamble sequence to initiate communication or synchronization.

Embodiments of the disclosure may be employed in various applications and industries. These include wireless battery chargers, consumer electronics, and the automotive industry. Specific applications may involve wireless charging for mobile phones, tablets, smartwatches, and other portable devices. The disclosed technology may be particularly relevant to Qi-standard-compliant electronics, employing integrated circuits that assist in inductive-charge-based wireless power transfer.

In embodiments, a technique is proposed for recognizing the preamble in Amplitude Shift Keying (ASK) communication within, for example, wireless power transfer systems adhering to the Qi standard. A preamble detection circuit that operates alongside an ASK demodulator can be employed for multiple purposes, such as debugging, triggering, confirmation of the beginning of the communication, and allowing an eventual primary demodulation chain (usually more accurate and characterized by higher power consumptions) to remain in a low-power state until a valid preamble is identified.

Aspects of the disclosure utilize a slicer within the preamble detection circuit that normalizes the incoming ASK signal to a configurable amplitude. The normalization provides robustness against variations in the analog signal and modulation depth, which can fluctuate due to various factors in the wireless power transfer environment. The slicer's output can be a square wave with a known amplitude, facilitating predictable behavior in subsequent processing stages.

Following the slicer, a correlator can implement a matched filter tailored to the expected preamble pattern. In Qi-compliant systems, the pattern consists of a sequence of consecutive binary ones encoded using biphase-mark coding. The correlator's length can be configured to match a specific number of preamble bits, allowing for flexibility in detection sensitivity and robustness. The knowledge of the features of the input signal of the correlator, such as amplitude and periodicity, allows for predicting the behavior of the correlator output.

The correlator's output can be fed into an estimation circuit, which can be realized, for example, as an exponential variance filter. When a valid preamble is present, the estimation circuit can generate a step-like response, usually with a predictable steady-state response. The estimation circuit can help mitigate the effects of noise and signal variations that might otherwise lead to false detections or missed preambles.

A decision logic circuit can analyze the output of the estimation circuit, determining if it exceeds a configurable threshold for a specified duration. The dual criterion of magnitude and persistence can help ensure that only valid preambles trigger a detection event, reducing the likelihood of false positives due to short signal spikes or intermittent interference.

In scenarios where ASK communications are infrequent but require rapid response when they do occur, the system can signal the main ASK demodulator to exit its low-power state and begin processing the incoming data stream, when a valid preamble is detected.

The disclosure emphasizes the configurability of various system parameters. For example, the slicer amplitude, correlator length, estimation filter characteristics, detection thresholds, and persistence requirements can all be adjusted. The flexibility optimizes the system for different operating conditions, protocol variations, or specific application requirements.

While the system is primarily described in the context of Qi-compliant wireless power transfer, the principles underlying this preamble detection method may apply to other wireless communication protocols that utilize preamble sequences for synchronization or packet detection. The detection approach and configurable parameters provide a robust and adaptable solution for identifying communication initiation in various wireless systems. These and other details are further described below.

FIG. 1 illustrates a block diagram of an embodiment wireless power system 100, which may also be called a wireless charging system. The system includes a transmitting device 110 and a receiving device 120, which may (or may not) be arranged as shown. The transmitting device 110 generates and transmits wireless energy 130 to the receiving device 120.

The transmitting device 110 may be a base station, such as a charging pad, which provides inductive power to the receiving device 120. The receiving device 120 can be, for example, a mobile device, a tablet, a cellular phone, a wearable communications device (e.g., a smartwatch), a digital pen, a wireless headphone, a toothbrush, a sensor, internet of things (IoT) device, or the like. The receiving device 120 is the consumer of inductive power.

The transmitting device 110 includes a transmitter coil 112 ($L_{TX}$). The receiving device 120 includes receiver coil 122 ($L_{RX}$). Each coil, or winding, can be a loop or magnetic antenna. The coils may have a physical core (e.g., ferrite core) or an air core. The coils may be implemented as an antenna strip or using a Litz wire. The resonant frequency of each coil is based on the shape and size of the looping wire or coil. In some embodiments, additional capacitance and inductance may be added to each coil to create a resonant structure at the desired resonant operating frequency.

In embodiments, the wireless energy 130 is transmitted from the transmitting device 110 to the receiving device 120 using resonant inductive coupling between the transmitter coil 112 and the receiver coil 122. The receiving device 120 may use the power to charge rechargeable batteries or power the components within it directly.

The wireless power system 100 also includes a backscatter communication link 140, represented by the dashed arrow, from the receiving device 120 to the transmitting device 110. The backscatter communication link 140 allows the receiving device 120 to communicate information back to the transmitting device 110, which can be used for power control, device identification, or other purposes.

Figure 2:
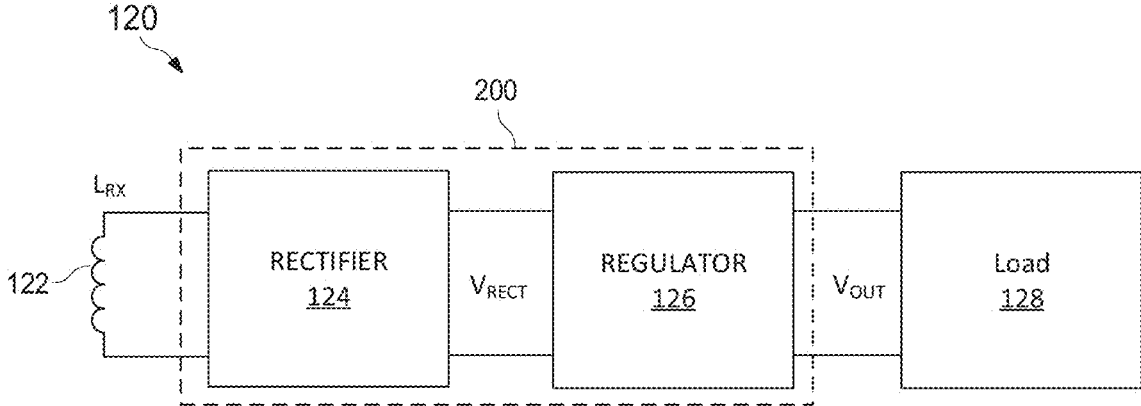
FIG. 2 is a block diagram of an embodiment receiving device.

FIG. 2 illustrates a block diagram of an embodiment receiving device 120. The receiving device 120 includes the receiver coils 122, a power charging circuit 200, and a load 128. The power charging circuit 200 includes a rectifier 124 and a regulator 126. The receiving device 120 may include additional components not depicted in FIG. 2, such as long-term storage (e.g., non-volatile memory, etc.), a non-transitory computer-readable medium, one or more antenna elements, drivers, demodulators, modulators, filter circuits, and impedance matching circuits.

The rectifier 124 converts the alternating current (AC) voltage at the receiver coils 122 to a direct current (DC) voltage. It may be any type of rectifier, such as a low-impedance synchronous rectifier having full-wave or half-wave rectification or an active rectifier. In embodiments, the rectifier 124 may be a bridge rectifier; however, other types of rectifiers are also contemplated.

The regulator 126 receives a voltage ($V_{RECT}$) from the rectifier 124 and then regulates that voltage to maintain a constant output voltage ($V_{OUT}$) at load 128. The regulator 126 may be any type of voltage regulator, such as a linear regulator (e.g., low drop-out (LDO) linear regulator). In some embodiments, the rectifier 124 and the regulator 126 may be part of a switched-mode power supply (SMPS) circuit.

As shown, load 128 is the primary benefactor of the transferred wireless energy 130. The load 128 may be a battery or a charge storage device, such as a cellular phone or smart watch battery. For example, the transmitting device 110 may be a charging pad and a smartwatch may be placed on the charging pad—the charging pad transfers wireless power to the smartwatch's battery without connecting cables between the two devices.

Several interface standards have been developed to standardize wireless power transfer and related functions. One such interface standard is Qi, which the Wireless Power Consortium (WPC) promotes. Qi and similar standardized protocols may be used to define the communication interface for controlling the power transfer in the wireless power system 100. For instance, the receiving device 120 may request a change (e.g., an increase, a decrease, a pause, etc.) related to the transferred wireless energy 130 from the transmitting device 110.

The mechanism of inductive power transfer can also be utilized for communication between the transmitting device 110 and the receiving device 120. For example, the receiving device 120 can inform the transmitting device 110 when the charging process is complete. This communication can be facilitated through a technique known as backscatter modulation, as specified in the Qi Standard for inductive wireless power transfer.

In practice, the receiving device 120 can alter its load impedance by, for example, changing the impedance of the load 128. The change in the impedance results in observable variations in the amplitude of the current or voltage in the transmitter coil 112, due to the mutual inductance obtained when the two coils are arranged sufficiently close to each other, allowing information to be transmitted from the receiving device 120 to the transmitting device 110 and consequently implementing the backscatter communication link 140.

Figure 3:
FIG. 3 is a block diagram of an embodiment transmitting device.
Figure 3:
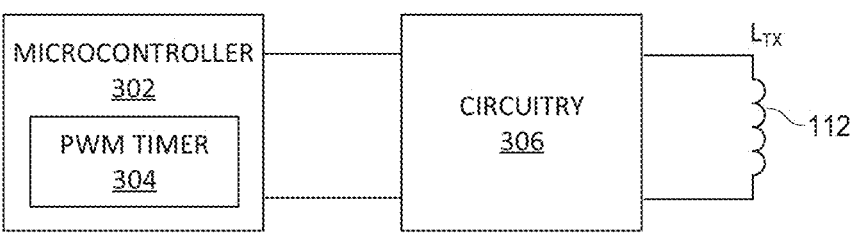

FIG. 3 illustrates a block diagram of an embodiment transmitting device 110. The transmitting device 110 includes a microcontroller 302, additional circuitry 306, and the transmitter coil 112, which may (or may not) be arranged as shown. Transmitting device 110 may include memory for storage. In embodiments, microcontroller 302 includes embedded memory. In embodiments, the PWM timer circuit 304 is embedded within the microcontroller 302.

Generally, a digital modulation scheme represents digital data using a finite number of distinct signals. ASK modulation refers to a modulation scheme in which digital data is represented as binary variations in the amplitude of a carrier wave.

In ASK-based communication, the transmitting device 110 generates a carrier signal. The carrier signal is typically a sinusoidal wave produced by filtering a PWM-generated square wave. The digital information to be transmitted can be associated with the modulation of the amplitude of the carrier signal.

In embodiments, the PWM timer circuit 304 embedded within the microcontroller 302 generates a PWM square wave based on programmed parameters. Microcontroller 302 can precisely control the square wave's frequency, duty cycle, and timing.

In embodiments, PWM timer circuit 304 can employ frequency dithering by slightly varying the signal frequency according to a predetermined pattern stored in a dithering table. The potentially dithered PWM signal is sent to the transmitter coil, generating an electromagnetic field for power transfer and data communication. The approach allows for simultaneous power transfer and data transmission, with the data essentially riding on the power transfer signal.

After PWM timer circuit 304 generates the digital square wave, it is passed through additional circuitry 306, such as a power inverter and a filter, to create a sinusoidal wave used in the inductive power transfer process. The receiving device 120 rectifies the induced signal at the receiver coil 122, which charges the receiving device 120. In embodiments, the resonant filtering is performed by a capacitor and the transmitter coil 112.

Figures 4, 5:
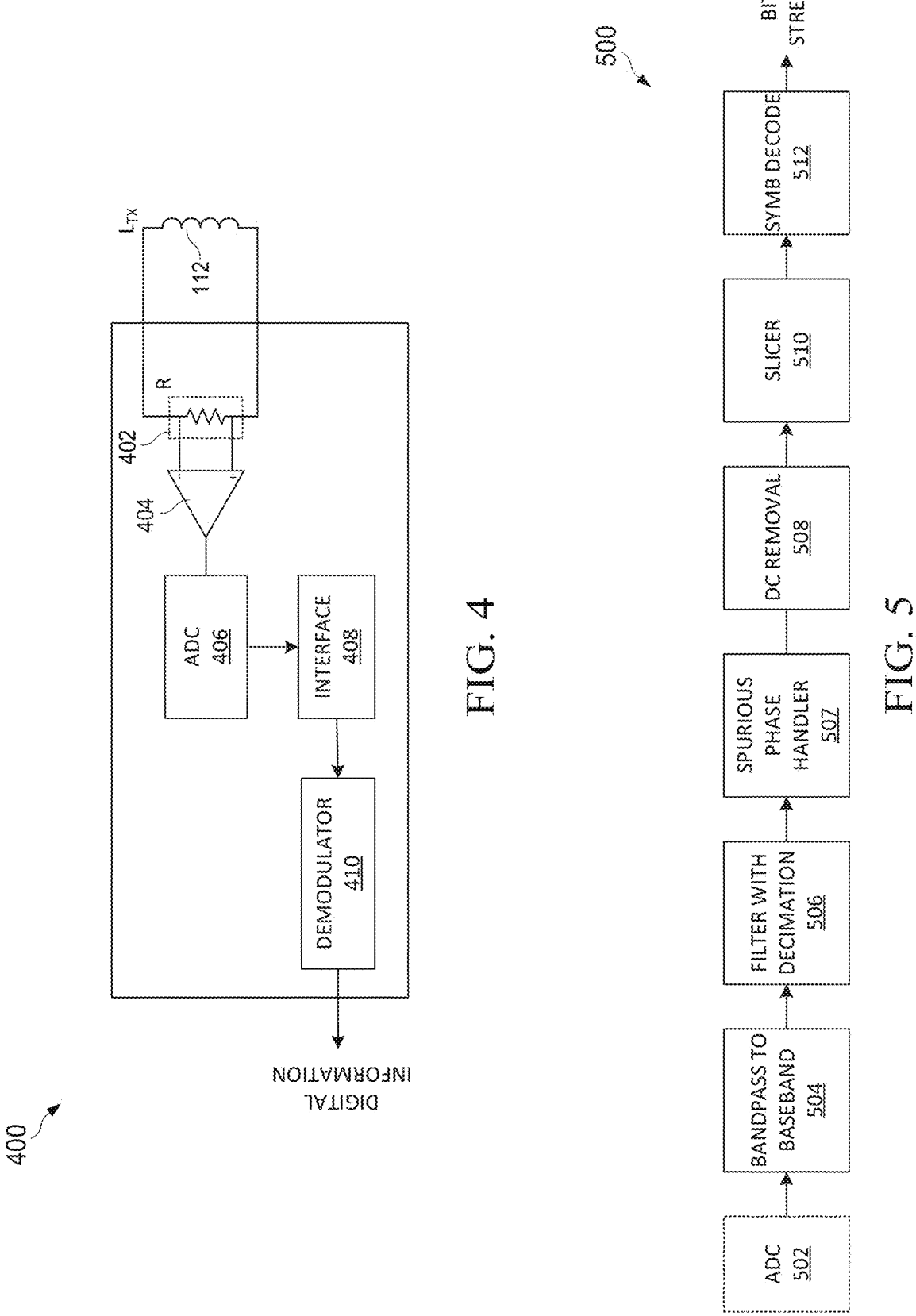
FIG. 4 is a schematic of an embodiment sensing circuit.
FIG. 5 is a circuit diagram of an embodiment demodulator circuit.

FIG. 4 illustrates a schematic of an embodiment sensing circuit 400, which may be in transmitting device 110 for backscatter modulation detection. Sensing circuit 400 is coupled to the terminals of the transmitter coil 112. Sensing circuit 400 includes a sense resistor (R) 402, an amplifier 404, an analog-to-digital converter (ADC) 406, an interface 408, and a demodulator circuit 410, which may (or may not) be arranged as shown. Sensing circuit 400 may include additional components not shown.

When the receiving device 120 modulates its load 128 (for example, by changing its impedance), this causes detectable changes in the current or voltage of the transmitter coil 112. Sensing circuit 400 continuously monitors the characteristics of the transmitter coil 112, such as current or voltage.

The sense resistor 402 detects the variations through the transmitter coil 112. The voltage across the sense resistor 402 is proportional to the coil current. The amplifier 404 amplifies the voltage across the sense resistor 402 and feeds it into the ADC 406.

ADC 406 converts the amplified analog voltage across the sense resistor 402 to a digital signal. In embodiments, ADC 406 is coupled to the demodulator circuit 410 through the interface 408. In embodiments, interface 408 involves a serial data interface and a pre-conditioning digital signal processing unit, responsible for either removing residual DC components or band-pass filtering in the neighborhood of the ASK carrier frequency or windowing the incoming signal. In embodiments, interface 408 is a direct or indirect interface, followed by offset removal and a resonant-like digital filter.

The digital signal from the ADC 406 is demodulated by the demodulator circuit 410. Demodulator circuit 410 analyzes the amplitude variations in the digital signal to extract the digital information sent by the receiving device 120.

FIG. 5 illustrates a circuit diagram of an embodiment demodulator circuit 500, which can be implemented as the demodulator circuit 410 in FIG. 4. The demodulator circuit 500 includes an analog-to-digital converter (ADC) 502, a bandpass-to-baseband converter 504, a filter with decimation 506, an optional spurious phase handler circuit 507, a DC removal high-pass filter (HPF) 508, a slicer 510, and a symbol decoding circuit 512, which may (or may not) be arranged as shown. Demodulator circuit 500 may include additional components not shown.

The ADC 502 can be similar to the ADC 406 shown in FIG. 4. It acquires modulated samples from the primary coil of the transmitting device 110, which represents the backscatter modulated signal from the receiving device 120.

The bandpass-to-baseband converter 504 is a circuit that shifts the transmitted signal spectrum into the baseband domain, centering it around DC (i.e., 0 Hz). It effectively translates the frequency of the received signal from its carrier frequency down to baseband, where the information content of the signal is easier to extract.

The bandpass to baseband converter 504 can employ complex multiplication or quadrature mixing techniques. For example, it can multiply the incoming bandpass signal with a locally generated carrier signal that matches the frequency and phase of the received signal's carrier. The multiplication process results in sum and difference frequencies. The sum frequencies are typically filtered out, leaving the difference frequencies representing the original modulating signal centered around DC.

By shifting the signal to baseband, the bandpass to baseband converter 504 simplifies subsequent signal processing steps and reduces the computational requirements for the following stages of the demodulator circuit. The conversion can be particularly beneficial in ASK demodulation, allowing for easier amplitude detection and symbol recovery in the baseband domain.

As an image rejection filter, filter with decimation 506 removes high-frequency artifacts generated by the bandpass-to-baseband converter 504 during the downconversion process. The artifacts can include mixer products, harmonics, and other unwanted spectral components outside the desired baseband frequency range. By attenuating the high-frequency components, the filter with decimation 506 isolates the desired baseband signal and improves the overall signal-to-noise ratio. In embodiments, the filter with decimation 506 executes low-pass filtering and can perform notch filtering.

In addition to filtering, the filter with decimation 506 may incorporate decimation. Decimation involves reducing the signal's sampling rate, which can be done safely after low-pass filtering because the bandwidth requirements are decreased after downconversion. The decimation process typically involves discarding some samples or averaging groups of samples to produce a single output sample.

The decimation factor can be chosen based on the ratio between the ADC sampling rate and the desired output rate, which is often related to the symbol rate of the received signal. By reducing the sample rate, decimation helps to lower the computational requirements for subsequent processing stages and can improve the effective resolution of the signal.

Various digital filter structures can be used to implement the filter with decimation 506. Common approaches include finite impulse response (FIR) filters, infinite impulse response (IIR) filters, or cascaded integrator-comb (CIC) filters. The choice of filter structure depends on factors such as the required stopband attenuation, passband ripple, phase linearity, and computational efficiency.

The filter with decimation 506 helps condition the signal for subsequent processing stages, ensuring the baseband signal is clean and appropriately sampled for accurate demodulation.

In embodiments, the spurious phase handler circuit 507 is coupled between the filter with decimation 506 and the DC removal high-pass filter (HPF) 508. In embodiments, the spurious phase handler circuit 507 may be positioned between the bandpass-to-baseband converter 504 and the filter with decimation 506, with the specific placement depending on system requirements and performance optimization considerations.

In embodiments involving IQ demodulation, the spurious phase handler circuit 507 is configured to address unwanted phase modulation that can arise during the communication in the wireless power transfer process. The circuit implements techniques to minimize the impact of these spurious phase variations on the amplitude-shift keying (ASK) demodulation process or to handle a virtual phase-shift keying (PSK) demodulation associated with the aforementioned spurious phase variations.

The spurious phase handler circuit 507 can employ a Cartesian-to-polar coordinates converter to transform the in-phase (I) and quadrature (Q) components of the signal into magnitude (M) and phase (P) representations. This transformation allows for separate processing of the amplitude and phase components of the signal, enabling the handling of unwanted phase modulation.

The spurious phase handler circuit 507 can process the complex signal to extract the magnitude component while compensating for phase variations that could otherwise interfere with symbol detection. The circuit can implement various techniques for phase compensation, including phase tracking, phase error correction, and adaptive phase adjustment algorithms.

The DC removal high-pass filter (HPF) 508 is coupled to the output of the filter with decimation 506. The DC removal high-pass filter (HPF) 508 is configured to remove the DC component that typically emerges during the downconversion process. During downconversion, a DC offset can be introduced into the signal due to, for example, local oscillator (LO) leakage, mixer imbalance, or a strong interferer. If left unaddressed, the DC offset can saturate subsequent demodulator stages, potentially leading to incorrect symbol decisions.

The DC removal high-pass filter (HPF) 508 is configured to attenuate very low-frequency components, effectively removing the DC offset while allowing higher-frequency components (which contain the desired signal information) to pass through. The cutoff frequency of the DC removal high-pass filter (HPF) 508 is typically set well below the lowest frequency of interest in the modulated signal but high enough to remove the DC component effectively.

In digital implementations, the DC removal high-pass filter (HPF) 508 can be realized using various filter structures. One common approach is to use a first-order Infinite Impulse Response (IIR) filter. Another approach is to use a Finite Impulse Response (FIR) filter designed with a high-pass response. FIR filters offer linear phase response and stability advantages but may require more computational resources than IIR filters.

For systems dealing with I and Q channels (or M and P in polar coordinates), separate high-pass filters can be employed for each channel to ensure proper DC removal across all signal components.

The DC removal high-pass filter (HPF) 508 may incorporate adaptive techniques for varying DC offsets. The adaptive filters can adjust their parameters in real-time based on the input signal characteristics, providing more robust DC removal across different operating conditions.

In wireless power transfer systems, effective DC removal maintains the integrity of the modulated signal. By removing the DC component, the DC removal high-pass filter (HPF) 508 helps center the signal around zero, facilitating more accurate symbol detection in subsequent demodulator stages.

Slicer 510 is coupled to the output of the DC removal high-pass filter (HPF) 508. It helps clean up the received signal, which may have been affected by noise and distortions during transmission.

Due to the previous DC removal stage, slicer 510 accepts a typically symmetric signal around zero. Slicer 510 performs a binary decision based on a threshold parameter. The threshold determines the decision boundary between the two output states, affecting how the incoming signal is interpreted as binary data.

The process creates a two-level (binary) output signal, representable on one or more bits. Slicers 510 is substantially a hysteresis comparator. Slicer 510 compares the incoming signal level to a couple of opposite thresholds. If the signal level is above the positive threshold, the slicer outputs one binary state (e.g., a logical '1'). If the signal level is below the negative threshold, it outputs the other binary state (e.g., a logical '0').

Slicer 510 prepares the signal for subsequent symbol decoding by compressing the information into a binary output with two opposite values. The compression simplifies the data stream while preserving the essential information encoded in the signal's amplitude variations.

The symbol decoding circuit 512 is coupled to the output of slicer 510. It interprets the binary stream to extract meaningful data according to the communication protocol used in the wireless power transfer system. In the context of wireless power transfer systems compliant with the Qi standard, the symbol decoding circuit 512 is designed to handle bi-phase mark coding. This coding scheme is synchronized with a clock signal with a frequency of 2 kHz±4%, which also corresponds to the bit rate of the communication.

The bi-phase mark coding used in Qi-compliant systems has specific characteristics recognized by the symbol decoding circuit 512. There is a systematic edge at the beginning of each clock period. The absence of an intermediate transition within the bit period represents a '0' bit. A '1' bit is represented by a transition at the mid-point of the bit period.

To decode the information, the symbol decoding circuit 512 may employ edge detection mechanisms to identify the transitions in the binary stream from slicer 510. The symbol decoding circuit 512 can determine whether each bit period contains a '0' or a '1' by analyzing the presence or absence of these mid-bit transitions.

In embodiments, the symbol decoding circuit 512 handles the message structure defined by the Qi standard. Typically, a message begins with a preamble consisting of a sequence of consecutive '1' bits. The number of preamble bits is not fixed and the choice of a specific preamble length may depend on various factors. In particular, according to the Qi standard, it can range from eleven to twenty-five bits. After the preamble, the symbol decoding circuits 512 identifies a start bit (always '0'), one data byte (8 bits of actual information), a parity bit (set to '1' if the data byte contains an even number of '1' bits), and a stop bit (always '1').

To accomplish this, the symbol decoding circuit 512 may incorporate state machines or sequence detectors to track the progression through the message components. This allows the symbol decoding circuit 512 to properly frame the incoming data and extract the relevant information bits. The symbol decoding circuit 512 may also include error detection mechanisms. For instance, it can verify the parity bit to ensure the integrity of the received data byte. If a parity error is detected, it may flag the data as potentially corrupted.

Symbol decoding circuit 512 may need to adapt its decoding strategy based on the incoming demodulated signal, e.g. switching between different decoding algorithms.

The output of the symbol decoding circuit 512 is typically a stream of decoded data bytes, representing the information transmitted from the receiving device 120 to the transmitting device 110. The data may include information about power requirements, device identification, or other control signals relevant to the wireless power transfer process.

The demodulator circuit 500 processes the received signal through these stages to extract the digital information sent by the receiving device 120. The arrangement allows for flexible handling of the ASK modulation, addressing challenges posed by spurious phase modulation in specific frequency ranges of wireless power transfer systems.

Figure 6:
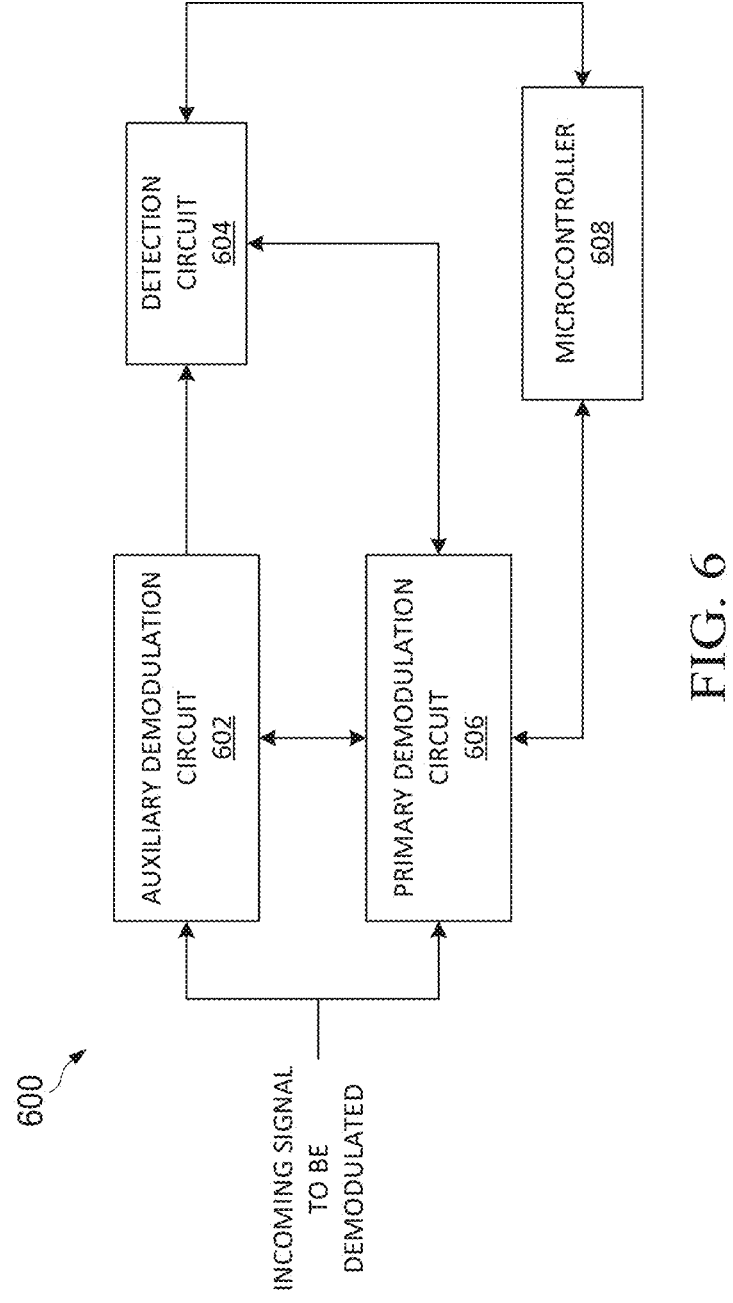
FIG. 6 is a circuit diagram of an embodiment demodulation circuit.

FIG. 6 illustrates a circuit diagram of an embodiment demodulation circuit 600, which may be implemented in the transmitting device 110. Demodulation circuit 600 can be suitable for scenarios where ASK communications are infrequent but require rapid response when they do occur. The demodulation circuit 600 can include an optional auxiliary demodulation circuit 602, a detection circuit 604, a primary demodulation circuit 606 (typically more accurate and power-consuming than the auxiliary demodulation circuit 602), and a microcontroller 608, that can (or cannot) correspond to the microcontroller 302 of transmitting device. The demodulation circuit 600 may (or may not) be arranged as shown and its constituting elements may also share some specific hardware circuits. Additional components not depicted may also be included in the demodulation circuit 600.

The optional auxiliary demodulation circuit 602 represents an ASK demodulation circuit potentially involving all the elements in the chain preceding symbol decoding. It can be implemented by involving the ADC 502, the bandpass-to-baseband converter 504, the filter with decimation 506, the spurious phase handler circuit 507, the DC removal high-pass filter (HPF) 508 and eventually the slicer 510 of the demodulator circuit 500 of FIG. 5.

In embodiments, the auxiliary demodulation circuit 602 can be employed when a power-demanding demodulation part characterizes the primary demodulation circuit 606. Accordingly, it would be advantageous to keep the primary demodulation circuit 606 entirely OFF in this arrangement. In this configuration, the auxiliary demodulation circuit 602 is expected to consume less power than the primary demodulation circuit 606 when demodulation is performed and generates the signal for the detection circuit 604.

The auxiliary demodulation circuit 602 processes the incoming ASK signal, performing initial demodulation steps such as bandpass to baseband conversion, filtering, DC removal, and slicing. The circuit, if present, operates continuously, providing a constant stream of processed data to the detection circuit 604. Moreover, it can share some hardware components and exchange signals with the primary demodulation circuit 606. Additional components not depicted may also be included in the auxiliary demodulation circuit 602.

The detection circuit 604 continuously monitors the output of the auxiliary demodulation circuit 602 (when present) or of a portion of the primary demodulation circuit 606 (when the auxiliary demodulation circuit 602 is not present), searching for specific patterns that indicate the start of a preamble.

For example, the detection circuit 604 is configured to identify a preamble, while a portion or the entire primary demodulation circuit 606 remains inactive. The arrangement allows the more power-intensive, primary demodulation circuit 606 to remain dormant when no modulation occurs.

Upon identifying a potential preamble, the detection circuit 604 can directly or indirectly (i.e., assisted by the microcontroller 608) activate entirely the primary demodulation circuit 606. This approach can significantly reduce power consumption during communication inactivity, particularly in wireless power transfer systems where communication may be intermittent.

The detection circuit 604 can be designed to recognize the preamble sequence within a specific time frame. This time frame is usually shorter than the full duration of the preamble, allowing for early detection. The detection circuit 604 can be configured to identify a partial preamble sequence, which may be sufficient to initiate the activation process of the primary demodulation circuit 606.

The primary demodulation circuit 606 can be represented as a demodulation system configured to process the incoming signal in terms of demodulation and decoding. While demodulation is expected to be always done, decoding can be partial or complete. The demodulation circuit 600 typically operates across at least two distinct data rate (or speed) domains to optimize processing efficiency.

When the primary demodulation circuit 606 is characterized by a sub-portion of demodulation circuits requiring much less power consumption than decoding circuits or their complementary sub-portion, on its hand not strictly necessary for the generation of the signal for the detection circuit 604, the auxiliary demodulation circuit 602 is not necessary for the demodulation circuit 600 and only the low-power demodulation sub-portion of the primary demodulation circuit 606 is turned on.

Accordingly, in an extreme-case scenario from the hardware resource-sharing perspective, the demodulation circuit 600 includes an auxiliary demodulation circuit 602 coincident with the sub-portion of the primary demodulation circuit 606 enabled in low-power mode. In any case, every intermediate case, in terms of hardware sharing between the primary demodulation circuit 606 and the auxiliary demodulation circuit 602, is similarly contemplated.

The high-speed domain of the primary demodulation circuit 606 operates at the initial sampling rate, handling the raw incoming signal. This is followed by one or more lower-speed domains that process the signal after each decimation, reducing the data rate while preserving essential information, for example, after downconversion.

For example, the lowest-speed domain can operate at ten samples per bit interval, allowing for precise bit-level processing. The multi-domain approach enables the circuit to balance and distribute processing power accurately and adequately, adapting its operations to the incoming signal's characteristics at different demodulation stages. The primary demodulation circuit 606 can also share some components (e.g., the ADC) and transfer data with the auxiliary demodulation circuit 602.

A trigger signal can be generated upon detecting a valid preamble by the detection circuit 604. This trigger signal may be coupled to the microcontroller 608 or other control circuitry responsible for managing demodulators' power states (e.g., bringing the primary demodulation circuit 606 out of its low-power state) or handling the different phases of the communication protocol.

It should be understood that the term generating a trigger signal and its variants, as used throughout this disclosure, are not limited to the production of a physical electrical signal. The term can encompass a wide range of implementations and functionalities. For example, generating a trigger signal may involve setting a flag in a register, updating a status bit, or modifying a value in memory.

Further, generating a trigger signal does not necessarily result in the immediate activation of another component. The trigger signal may serve various purposes, including but not limited to facilitating debugging processes, initiating timing or synchronization events, confirming the beginning of a communication sequence, or indicating that an eventual primary demodulation chain may be activated.

In some implementations, the trigger signal may be used internally within the circuit for control or monitoring purposes without directly affecting external components. The specific implementation and use of the trigger signal may vary depending on the particular system architecture, power management strategies, and operational requirements of the device in which the preamble detection circuit is employed.

In the context of the activation process of the primary demodulation circuit 606, several steps, such as powering up components, initializing registers, and stabilizing filters, may be involved. These steps can be timed to complete before the end of the full preamble sequence. By initiating this process early, based on partial preamble detection, the system can ensure that the primary demodulation circuit 606 is fully operational and ready to process the incoming data immediately following the preamble.

In embodiments, microcontroller 608 can act as an intermediary controller and supporter for preamble detection and demodulation regarding signal processing, setup choice, and communication decoding tasks. It can act as a central coordinator between the detection circuit 604 and the primary demodulation circuit 606, enhancing the system's flexibility and control capabilities. In this configuration, when the detection circuit 604 identifies a valid preamble or portions of a valid preamble sequence, it can send the trigger signal to the microcontroller 608. Upon receiving this signal, the microcontroller 608 can initiate a series of actions, such as activating the primary demodulation circuit 606. This may involve sending control signals to power up various components of the primary demodulation circuit 606, initializing registers, or configuring specific parameters based on the detected preamble characteristics. The microcontroller 608 can also manage the timing of the activation process, ensuring that the primary demodulation circuit 606 is fully operational and ready to process incoming data by the time the preamble sequence ends and the actual data transmission begins.

In embodiments, the detection circuit 604 can directly trigger the primary demodulation circuit 606, bypassing the microcontroller 608. This direct triggering can be advantageous in scenarios where minimal latency is critical or when simplified operation is preferred. In this case, the detection circuit 604 can generate a trigger signal sent directly to the primary demodulation circuit 606, initiating its transition from a low-power state to full operational mode. This direct path allows for rapid response to detected preambles, potentially reducing the overall system's power-up time and improving responsiveness to incoming data transmissions.

The timing of the activation sequence can be tuned based on various factors, including the known length of the preamble in the specific communication protocol (e.g., Qi standard), the time required for the primary demodulation circuit 606 to reach a stable state, and the desired trade-off between early activation and false positive avoidance. The detection circuit 604 can be configured with appropriate thresholds and detection criteria to balance these considerations.

By carefully managing this timing, the detection circuit 604 can improve power efficiency and data reception accuracy. The system can minimize the time spent in full-power operation while ensuring it is ready to process data as soon as the preamble ends.

The demodulation circuit 600 looks for a trade-off between power efficiency and high-performance signal processing. In embodiments, the auxiliary demodulation circuit 602, when present, continuously processes the incoming signal, while the detection circuit 604 monitors its output for preamble patterns. When a potential preamble is detected, the primary demodulation circuit 606 takes over the demodulation process, applying advanced signal processing capabilities to recover the transmitted data accurately. This hierarchical approach to demodulation balances power efficiency with sophisticated signal processing, making it well-suited for the demands of wireless power transfer communication systems.

Conventional ASK demodulation systems in wireless power transfer applications typically employ a continuous demodulation chain. While effective, this approach can lead to significant power consumption, as the entire demodulation chain remains active even during inactivity or when no modulation is present. Supporting firmware tasks for signal processing and decoding may also accentuate power consumption issues.

The continuous operation of a demodulation chain, even combined with supporting firmware processing, presents several drawbacks. First, it results in unnecessary power consumption during idle periods, which can be frequent in wireless power transfer scenarios. The inefficiency can be particularly problematic in battery-powered devices or applications where energy conservation is a priority. Second, the constant processing of input signals, even when no valid data is present, can increase the likelihood of false detections or errors due to noise or interference.

Further, the complexity of continuously running sophisticated signal processing algorithms involving dedicated hardware or even firmware can lead to increased heat generation and potential reliability issues over time. In portable devices, this can impact battery life and overall system performance. Additionally, the resources required for constant demodulation can limit the ability to allocate processing power to other critical functions within the device.

Embodiments of the disclosure provide an approach for identifying the preamble of Qi-compliant ASK communication, utilizing estimation techniques. This method can be implemented using a generic circuit design, offering flexibility across various hardware configurations.

An aspect of this approach is its high robustness to modulation depth variations and independence from specific demodulation circuits and setups. This characteristic can enhance the system's robustness across operating conditions and device variations.

The detection circuit 604 in these embodiments can incorporate configurable components. These components allow the system to make predictable, thus exploitable, the nature of estimation responses. Adjusting these configurable elements allows the detection circuit 604 to recognize preamble patterns effectively while adapting to various signal conditions (e.g., modulation depths).

The estimation-based method balances reliable preamble detection and power efficiency in ASK communication systems for wireless power transfer applications. The approach can offer advantages in consistency and adaptability compared to the conventional differential analysis methods or continuously operating demodulation chains.

In embodiments, the demodulation circuit 600 implements a hierarchical approach to signal processing through the primary demodulation circuit 606 and the auxiliary demodulation circuit 602. The primary demodulation circuit 606 can be configured to perform demodulation and decoding operations on the incoming ASK signal. The demodulation operations can involve processing the raw signal to extract the modulated information, including bandpass-to-baseband conversion, filtering, and amplitude detection. The decoding operations, performed only by the primary demodulation circuit 606, can involve interpreting the demodulated signal according to the communication protocol to extract meaningful data, such as identifying bit patterns, performing error checking, and recovering the transmitted information.

In contrast, the auxiliary demodulation circuit 602, when present, can be specifically configured to perform only demodulation operations and never perform decoding operations. This focused functionality allows the auxiliary demodulation circuit 602 to maintain a simpler architecture optimized for power efficiency during periods when full signal processing capabilities are not required. In embodiments, the auxiliary demodulation circuit 602 can perform the necessary demodulation tasks to generate signals suitable for preamble detection while consuming less power than the complete primary demodulation circuit 606.

Accordingly, in embodiments, the architectural distinction between the primary and auxiliary demodulation circuits enables the system to implement different power management strategies based on the characteristics and requirements of the demodulation and decoding operations. The primary demodulation circuit 606 can be fully activated when complete signal processing is needed. Meanwhile, the auxiliary demodulation circuit 602 or a minimal subset of the primary demodulation circuit 606 can handle the essential demodulation tasks during other periods.

Figures 7A, 7B:
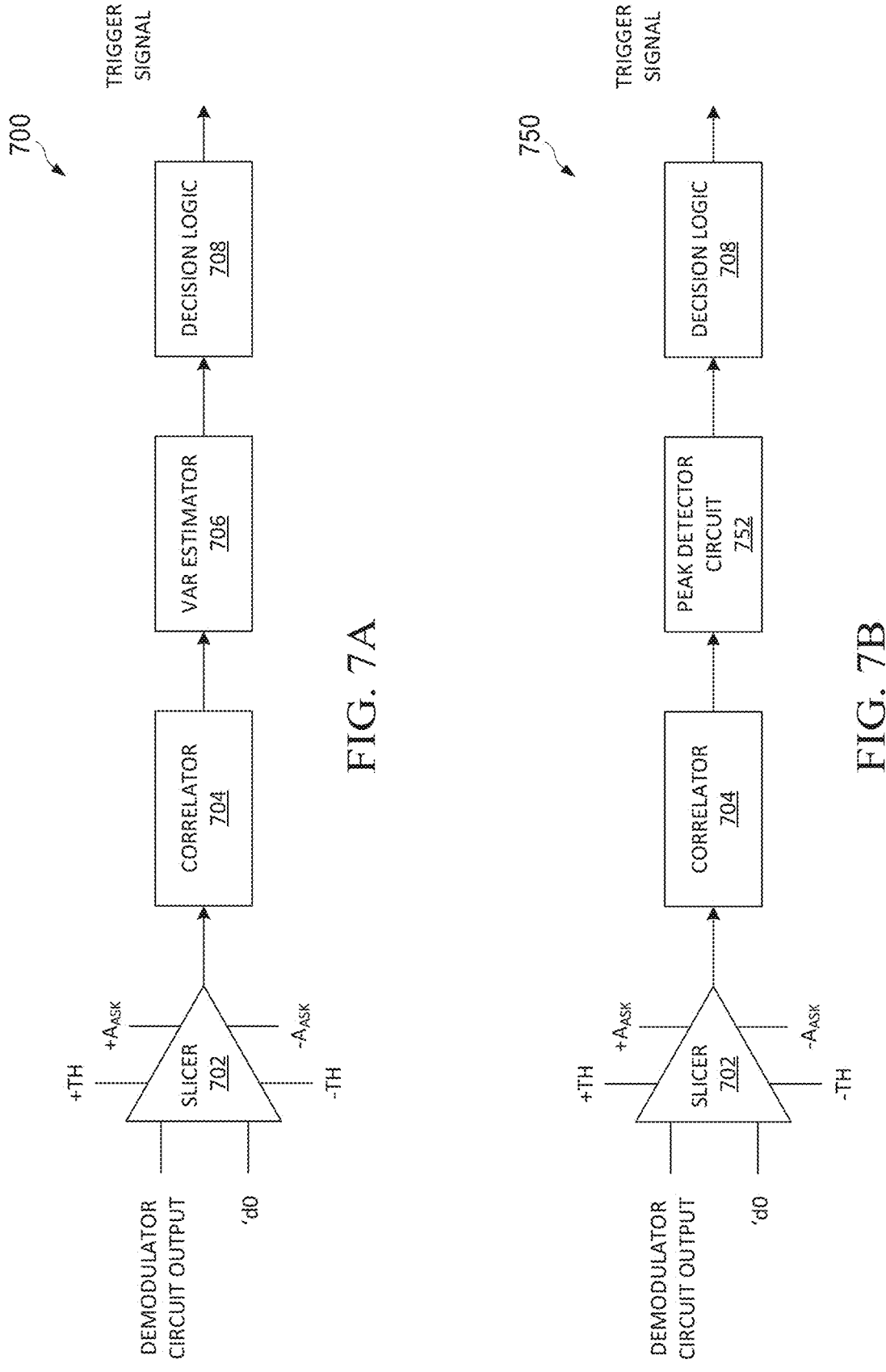
FIG. 7A is a circuit diagram of an embodiment detection circuit.
FIG. 7B is a circuit diagram of an embodiment detection circuit.

FIG. 7A illustrates a circuit diagram of an embodiment detection circuit 700, corresponding to the detection circuit 604 of FIG. 6. The detection circuit 700 implements an estimation-based detection method for identifying the preamble of ASK communication in a Qi-compliant system, for example.

Detection circuit 700 includes a slicer 702, a correlator circuit 704, a variance (VAR) estimator circuit 706 or an equivalent parameter estimator circuit from the information perspective (such as amplitude or Root Mean Square value), and a decision logic circuit 708, which may (or may not) be arranged as shown. Detection circuit 700 may include additional components not shown, may involve components functionally equivalent to those in FIG. 7A, or may not involve all the components shown in FIG. 7A.

The slicer 702 receives input from the auxiliary demodulation circuit 602 or the primary demodulation circuit 606. This input signal is a demodulated ASK signal without a DC component, simplifying further processing. The signal's number of samples per bit (e.g., n) is known, providing timing information for subsequent stages.

The slicer 702 receives the DC-less demodulated ASK signal as input and generates a normalized binary waveform with a configurable amplitude ($A_{ASK}$). A comparator within the slicer 702 controls the output value, with configurable threshold levels ($\pm TH$) and configurable amplitude levels ($\pm A_{ASK}$, in a bipolar output waveform scenario, zero and $A_{ASK}$ in a unipolar output waveform scenario). The comparator receives the configurable amplitude levels ($\pm A_{ASK}$, in a bipolar output waveform scenario, zero and $+A_{ASK}$ in a unipolar output scenario) as inputs and, based on these levels, generates an output signal at the output of the slicer 702 with the configured amplitude level.

While FIG. 7A illustrates the slicer 702 configured for a bipolar output waveform scenario, it should be appreciated that it can be readily modified to implement a unipolar output waveform scenario without departing from the scope of the present disclosure. Such modifications to achieve unipolar output operation would be readily understood by those of ordinary skill in the art. In the unipolar scenario, the slicer 702 would be configured to, for example, output between zero and $A_{ASK}$, rather than between $-A_{ASK}$ and $+A_{ASK}$.

These parameters, including threshold and amplitude levels, can be stored in configuration registers. One or more of these parameters may be chosen and set by firmware, providing flexibility in the circuit's operation. For parameters not directly set by firmware, slicer 702 can incorporate hardware-based computation. For example, the parameters can be calculated using formulas that relate them to the firmware-programmable parameters, ensuring coherence in the slicer's operation.

The output of the slicer 702 is coupled to the input of the correlator circuit 704, which processes the sliced signal. The correlator circuit 704 performs a single-bit or multi-bit correlation, effectively implementing a matched filter. The peaks of its output depend on the configurable amplitude of the slicer output and the number of bits to be correlated.

In embodiments, the correlator circuit 704 implements an FIR-matched filter on a sequence of correlated preamble bits ($N_{BIT\ PREAMBLE}$) square waves, corresponding to a sequence of binary ones in the biphase-mark encoding. Each preamble bit includes a configurable number of samples (n), depending on the ADC sampling frequency and the setup of the decimators in the auxiliary demodulation circuit 602. The total number of samples (or taps) processed by the FIR filter is given by the product between correlated preamble bits ($N_{BIT\ PREAMBLE}$) and signal's number of samples per bit (e.g., n).

It should be understood that while the correlation process is typically described in terms of whole bits and their associated samples, the actual implementation can be more flexible. The number of samples used in the correlation process need not always correspond to an exact multiple of the number of samples per bit. In some implementations, a fractional representation of bits may be used in the correlation.

For example, if there are 10 samples per bit in an incoming signal, the correlator could be designed to use 27 samples. This would correspond to 2.7 bits of the preamble sequence. Such a fractional representation can still provide effective correlation results and may be advantageous in certain hardware configurations or when optimizing for specific performance characteristics. The system can be designed to correlate over non-integer numbers of bits, allowing for more flexible and optimized detection strategies.

Therefore, the term "configurable number" in the correlation context should be interpreted broadly. It can refer to a whole number of bits, a fractional number of bits, or any number of samples that provides effective preamble detection, regardless of whether it aligns exactly with bit boundaries. This flexibility allows for various correlation strategies, such as correlating over different bit lengths with single or multiple threshold crossings.

This flexibility in correlation length allows for fine-tuning the preamble detection process to balance factors such as detection accuracy, hardware complexity, and power consumption. It also enables the system to adapt to various sampling rates and bit durations without being constrained to correlations that only operate on whole-bit multiples. The correlator output can be analyzed for different threshold crossings, allowing detection of varying numbers of symbols within the correlator, providing information about pattern matching across a range of symbol counts.

The value of correlated preamble bits ($N_{BIT\ PREAMBLE}$) can range from one to a maximum value, with the upper limit depending on the specification. If correlator hardware constraints are not fixed, the maximum value of correlated preamble bits ($N_{BIT\ PREAMBLE}$) can be limited by the maximum number of preamble bits.

In contrast, if correlator hardware constraints are fixed, the choice of the value of correlated preamble bits ($N_{BIT\ PREAMBLE}$) depends on the maximum number of samples processable by the hardware correlator filter (number of taps in an FIR filtering scenario) in the detection circuit 604 and the number of samples per bit (n).

These factors depend on the setup of the decimators along the signal processing chain of the demodulation circuit providing the ASK signal to the detection circuit 604 (i.e., auxiliary demodulation circuit 602 or the primary demodulation circuit 606).

For example, if the correlator is an FIR filter involving at most thirty taps and the number of samples per bit equals ten, no more than three preamble bits can be correlated.

When the preamble signal with amplitude $A_{ASK}$, provided by the slicer output and following the ASK modulation, is provided to the correlator circuit 704, a triangular wave response is observed on the output of the last-mentioned component. The triangular wave has the same period as the preamble square wave. The amplitude of the triangular wave ($A_{CORR}$) can be determined by the equation: $A_{CORR}= N_{BIT\ PREAMBLE} \times n \times A_{ASK}$.

For example, if the amplitude of the slicer output ($A_{ASK}$) equals one, the sequence of correlated preamble bits ($N_{BIT\ PREAMBLE}$) equals six, and the number of samples per bit equals ten, the resulting triangular wave has an amplitude of 60.

The same behavior and result can be obtained with a unipolar waveform on the slicer output, reminding that a bipolar waveform can be constructed by subtracting one from the unipolar waveform with amplitude doubled.

The correlator circuit 704 can be implemented using different hardware architectures, each offering distinct tradeoffs. Two common approaches are folded and partially unrolled implementations. Typically, a folded architecture uses a single multiply-accumulate (MAC) circuit iteratively to compute the correlation, reducing hardware area at the cost of increased computation time. In contrast, a partially unrolled implementation can use multiple multipliers, adders and(or) MAC circuits in parallel, computing multiple taps simultaneously. This approach increases throughput at the expense of a larger hardware area and potentially higher power consumption.

The specific hardware implementation of the correlator circuit 704, whether folded, partially unrolled, or implemented in some other configuration, can vary based on design choices and is not a constraining factor. Regardless of the chosen implementation, the correlator circuit 704 performs a single-bit or multi-bit correlation, effectively implementing a matched filter. The peaks of its output depend on the amplitude of the slicer output, the number of samples per bit interval and the number of bits to be correlated.

The output of the correlator circuit 704 may (or may not) feed into the variance estimator circuit 706, which estimates the variance of the correlated signal. In embodiments, the variance estimator circuit 706 implements an exponential variance operator, which allows for the estimation of a signal, effectively calculating the square of the Root Mean Square (RMS) value. Information equivalent and, in any case, strictly related to the signal (such as amplitude or RMS value) is similarly contemplated in the variance estimator circuit 706. In embodiments, the information is related to the energy of the signal.

In embodiments, the variance estimator circuit 706 can operate based on the following recursive equation: $\sigma^2[n]=S[n]=(1-\alpha[S[n-1]+\alpha(x[n]-\mu[n-1])^2]$, where $\alpha=2^{-k}$ and $\mu[n]$ is the exponential average given by $\mu[n]=\alpha x[n]+(1-\alpha)\times\mu[n-1]$, $x[n]$ represents the input signal (output from the correlator circuit 704), $\sigma^2[n]=S[n]$ is the estimated variance, and the parameter $\alpha$ determines the time constant of the estimation, with k being a non-negative integer. IIR filter equations govern the exponential average and variance calculations in the variance estimator circuit 706. This implementation allows for efficient recursive computation of the variance estimate, adapting to changes in the signal over time.

In embodiments, the IIR filter computing the exponential variance estimates the correlator response. For an input signal periodic with known waveform, the response of the exponential variance is expected to be ideally constant, apart from an initial transient.

In real scenarios, the response can show fluctuations, larger for higher exponential variance $\alpha$, around a horizontal asymptote, that gets closer to the square value of the RMS of the corresponding continuous-time input waveform for a higher number of samples per bit interval.

For example, given a triangular waveform with amplitude $A_{CORR}=N_{BIT\ PREAMBLE}\times n\times A_{ASK}$, the ideal horizontal asymptote would be $$\frac{A_{CORR}^2}{3} = \left(N_{BIT\ PREAMBLE} \times n \times \frac{A_{ASK}}{3}\right)^2.$$

When preamble begins, the exponential variance signal exhibits a step from zero to the value of horizontal asymptote. The fluctuations around the horizontal asymptote could affect preamble detection accuracy.

For this reason, the variance estimator circuit 706 can include a smoothing filter to address this issue and simplify detection. The additional smoothing filter helps to smooth out the variance profile, reducing the impact of short-term fluctuations on the preamble detection process.

This disclosure does not constrain the specific implementation details of the exponential variance and smoothing filters, which can be selected based on design requirements and performance considerations. An example implementation of exponential variance filter is a co-pending application owned by the same assignee and designated as Application Ser. No. 19/355,919, filed Sep. 22, 2025, which is hereby incorporated by reference herein in its entirety.

The variance estimator circuit 706 provides a measure of the signal's energy that the decision logic circuit 708 can use to detect the presence of a valid preamble in the ASK communication. In embodiments, the decision logic circuit 708 processes the output from the variance estimator circuit 706 to generate a trigger signal. In embodiments, the decision logic circuit 708 implements a threshold-based approach for preamble recognition.

In the threshold-based approach, the VAR response overcoming a given threshold can be exploited for preamble recognition. For example, if the VAR response exceeds a predetermined threshold for a certain number of consecutive samples, the preamble detection can be considered reliable. The number of consecutive samples required for confirmation can be chosen by firmware, allowing flexibility in the detection criteria.

The threshold used by the decision logic circuit 708 can be either chosen by firmware or computed by hardware. It can be configured as a fraction of the expected steady-state value; in this case, the threshold is given by the equation:

$$\alpha \times \frac{(N_{BIT\ PREAMBLE} \times n \times A_{ASK})^2}{3},$$

where $\alpha$ is a value between zero and one. The parameter $\alpha$ can be adjusted to balance detection sensitivity, detection reactivity and false positive rejection. This threshold configuration allows the decision logic circuit 708 to adapt to different preamble lengths, signal amplitudes, and desired reaction time when preamble begins.

When the decision logic circuit 708 determines that the response of the variance estimator circuit 706 exceeds the threshold for the required number of consecutive samples, it generates a trigger signal. The trigger signal can activate subsequent processing stages or indicate the detection of a valid preamble to other parts of the system.

In an embodiment, the detection circuit 700 may operate without the variance estimator circuit 706. Instead, the detection circuit 700 can directly process the output of the correlator circuit 704 to determine the presence of a valid preamble. In this configuration, the decision logic circuit 708 can be coupled directly to the output of the correlator circuit 704.

The decision logic circuit 708 may include a counter and comparator circuits. In this case, the counter circuit can increment a count value each time the output of the correlator circuit 704 or the variance estimator circuit 706 exceeds a predetermined threshold. In a valid preamble, the comparator circuit can compare the count value to a reference value corresponding to the number of samples associated with a certain number of consecutive preamble '1' bits.

When the count value reaches or exceeds the reference value, the decision logic circuit 708 can generate a trigger signal indicating the detection of a valid preamble. The threshold and reference values used in this configuration can be adjustable, allowing the detection circuit 700 to be tuned for different operating conditions or communication protocols.

Applying the threshold-based approach to the output of the correlator circuit 704 may offer reduced computational complexity compared to the variance estimation method. However, it may be more susceptible to false detections in noisy environments. The choice of involving the variance estimator circuit 706 (providing its output to the decision logic circuit 708) can depend on the expected signal quality, power consumption requirements, and the desired balance between detection sensitivity and false alarm rate.

As discussed above, the detection circuit 700 can incorporate various configurable parameters that can be adjusted to optimize performance across different operating conditions. For example, the slicer 702 can be configured with adjustable threshold levels ($\pm$TH) and amplitude levels ($\pm A_{ASK}$ in the bipolar output case, $A_{ASK}$ in the unipolar output one). Configuration registers may store these parameters, allowing firmware to set and modify them as needed. For parameters not directly set by firmware, the slicer 702 can incorporate hardware-based computation to calculate values based on firmware-programmable parameters, ensuring the slicer's operation coherence.

The correlator circuit 704 can also offer configurability in its operation. The number of correlated preamble bits ($N_{BIT\ PREAMBLE}$) can be adjusted, typically ranging from one to a maximum value determined by the available hardware, the target application, or the communication protocol. The flexibility allows the correlator circuit 704 to be tuned for different preamble lengths or signal characteristics. Additionally, the number of samples per bit (n) processed by the correlator circuit 704 can be configured, enabling adaptation to various sampling rates or bit durations.

In embodiments, the variance estimator circuit 706 may (or may not) include configurable elements that affect its behavior. For example, the time constant of the estimation, determined by the parameter $\alpha$, can be adjusted by modifying the value of k. The configurability allows the variance estimator circuit 706 to be tuned for different response times, sensitivities to changes in the input signal or accuracy of the estimation.

In the decision logic circuit 708, the first threshold for preamble detection can be configured as a fraction of the expected steady-state value. The first threshold can be set by firmware or computed by hardware based on other system parameters. The number of consecutive samples required to exceed the second threshold for a valid preamble detection can also be adjusted, providing a means to balance detection sensitivity with false alarm rejection.

These configurable aspects of the detection circuit 700 provide flexibility in adapting the system to various operating environments, signal characteristics, or performance requirements. Adjusting these parameters allows the circuit to be optimized for detection speed and robustness against noise or interference.

The detection circuit 700 incorporates mechanisms to maintain robustness against potential false detections to identify valid preambles while minimizing false positives. The slicer 702 normalizes the incoming signal, providing a consistent input to the correlator circuit 704 regardless of variations in the analog circuitry or modulation depth. The correlator circuit 704 performs a single-bit or multi-bit correlation on the normalized signal, helping to match valid preambles. The variance estimator circuit 706 enhances robustness by estimating the correlated signal's energy, eventually smoothing out short-term fluctuations. The decision logic circuit 708 applies additional criteria, such as requiring the variance estimator output to exceed a threshold for a specific number of consecutive samples.

In scenarios where a zero or a sequence of zeros occurs in the middle of a sequence of ones or where the demodulated signal is affected by high noise (e.g., in the proximity of the slicer's hysteresis region), the detection circuit 700 can effectively reset its detection process. The configurable nature of the detection circuit 700 allows for fine-tuning of detection parameters, enabling optimization for different operating conditions.

By combining these layers of signal processing and decision-making, the detection circuit 700 can provide robust preamble detection even in challenging signal environments, effectively distinguishing between valid preambles and other signal patterns that might superficially resemble a preamble.

In an embodiment, the variance estimator circuit 706 is optional. For example, the decision logic circuit 708 is directly coupled to the output of the correlator circuit 704, or the variance estimator circuit 706 is bypassed (e.g., the detection circuit 700 may be able to operate in multiple modes). In this configuration, the decision logic circuit 708 is configured to analyze the output of the correlator circuit 704 directly without the intermediate step of variance estimation.

In this arrangement, the decision logic circuit 708 is designed to count the number of peaks in the output signal from the correlator circuit 704. The peaks correspond to the patterns generated by the correlator circuit 704 when it detects portions of the preamble sequence. The decision logic circuit 708 compares the amplitude of each peak to a predetermined threshold value. When a peak exceeds this threshold, it is counted as a potential preamble bit.

The decision logic circuit 708 can keep a running count of the number of peaks that exceed the threshold. In embodiments, the decision logic circuit 708 is configured with a predetermined count value representing the number of peaks required to constitute a valid preamble or portions of a valid preamble sequence. The count value can be adjusted based on the specific requirements of the communication protocol or the desired sensitivity of the preamble detection.

When the number of counted peaks reaches or exceeds the predetermined count value, the decision logic circuit 708 can determine that a valid preamble or portions of a valid preamble sequence have been detected. At this point, it can generate a trigger signal to indicate the successful detection of a preamble. The trigger signal can activate subsequent processing stages or notify other system parts that a valid communication sequence is beginning.

The direct peak-counting approach can offer an alternative method for preamble detection that can be simpler in implementation and potentially faster in response time compared to the variance estimation. However, it may be more susceptible to false detections in noisy environments. The choice between using the variance estimator or direct peak counting can depend on factors such as the expected signal quality, power consumption requirements, and the desired balance between detection sensitivity and false alarm rate.

FIG. 7B illustrates a circuit diagram of an embodiment detection circuit 750, corresponding to the detection circuit 604 of FIG. 6. The detection circuit 750 implements a peak-based method for identifying the preamble of ASK communication in a Qi-compliant system, for example.

Detection circuit 750 includes a slicer 702, a correlator circuit 704, a peak detector circuit 752, and a decision logic circuit 708, which may (or may not) be arranged as shown. The detection circuit 750 is substantially similar to detection circuit 700 of FIG. 7A, with peak detector circuit 752 replacing the variance estimator circuit 706.

In embodiments, peak detector circuit 752 receives the output from correlator circuit 704 and identifies peak values in the correlated signal. Peak detector circuit 752 processes the triangular wave output from correlator circuit 704, detecting amplitude peaks corresponding to matched portions of the preamble sequence. The detected peaks can directly indicate the presence of consecutive '1' bits in the preamble sequence.

The peak detector circuit 752 couples between correlator circuit 704 and decision logic circuit 708, providing peak information to the decision logic circuit 708. In this configuration, the decision logic circuit 708 maintains its counter value even when samples fall below the threshold, unlike the implementation in FIG. 7A. External events, such as a timeout event, can reset the counter.

In embodiments, the correlation strategy offers flexibility in implementation. Using a correlator tuned to a smaller number of symbols (bits) and counting consecutive peaks over a threshold provides equivalent information to implementing a correlator on a larger number of symbols (bits) with a higher threshold and observing a single threshold crossing.

For example, a correlator operating on N+M−1 symbols with a single higher threshold crossing can provide the same information as a correlator on N symbols with M consecutive peaks crossing the threshold. This flexibility allows the circuit to achieve the same detection performance through different configurations, enabling optimization based on specific system requirements and hardware constraints.

Figure 8:
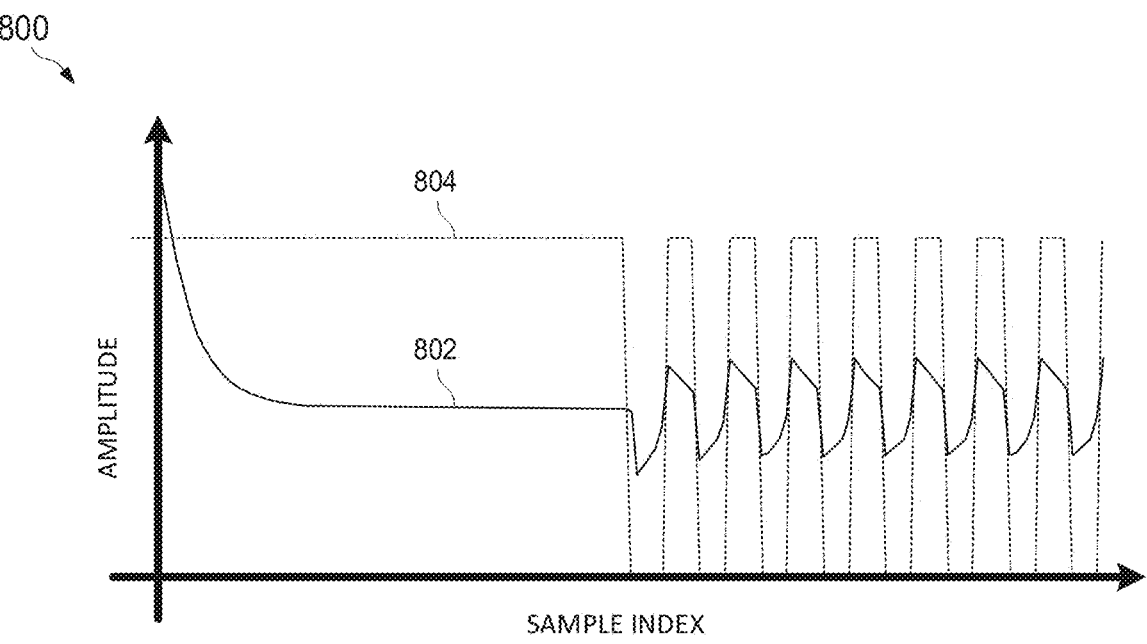
FIG. 8 is an embodiment waveform diagram.

FIG. 8 illustrates an embodiment waveform diagram 800 depicting the signal transformation from the output of the auxiliary demodulation circuit 602 or the primary demodulation circuit 606 to the output of the slicer 702 in the detection circuit 700. FIG. 8 includes an input signal 802 representing the output of the auxiliary demodulation circuit 602 or the primary demodulation circuit 606 and an output signal 804 representing the output of the slicer 702.

The input signal 802 represents a preamble sequence of consecutive biphase-mark ones in ASK modulation. This waveform reflects the characteristic shape of a demodulated ASK signal, potentially affected by some noise due to interferences in the wireless power transfer environment. Generally, the signal maintains a discernible pattern of repeated pulses, each corresponding to a biphase-mark '1' bit in the preamble sequence. It does not involve a DC component to simplify the normalization process done by the slicer 702.

The output signal 804 illustrates a possible normalized square wave produced by the slicer 702. This waveform consists of a series of uniform rectangular pulses with consistent high and low levels. In a bipolar output scenario, the high level corresponds to the positive configurable amplitude level $(+A_{ASK})$, and the low level corresponds to the negative configurable amplitude levels $(-A_{ASK})$ set for the slicer output. In a unipolar output scenario, the high level corresponds to the configurable amplitude level $(A_{ASK})$, and the low level corresponds to zero.

Slicer 702 generates the output signal 804 by comparing the input signal 802 against configurable threshold values symmetric with respect to zero. In a bipolar output scenario, when the input signal 802 exceeds the positive threshold (+TH), the output transitions to the positive configurable amplitude level $(+A_{ASK})$; when it falls below the negative threshold (−TH), the output signal 804 shifts to the negative configurable amplitude level $(-A_{ASK})$. In a unipolar output scenario, when the input signal 802 exceeds the positive threshold (+TH), the output transitions to the configurable amplitude level $(A_{ASK})$. When it falls below the negative threshold (−TH), the output signal 804 shifts to zero. In the unipolar and bipolar output scenarios, the previous output value is maintained when the input signal 802 does not exceed the positive threshold (+TH) and does not fall below the negative threshold (−TH).

The process effectively normalizes the varying amplitudes of the input signal 802 into a consistent, two-level representation. The resulting square wave delineates each biphase-mark '1' bit in the preamble sequence, maintaining the same number of pulses as the input signal but with standardized amplitude and shape, facilitating easier processing in subsequent stages of the detection circuit.

Figure 9:
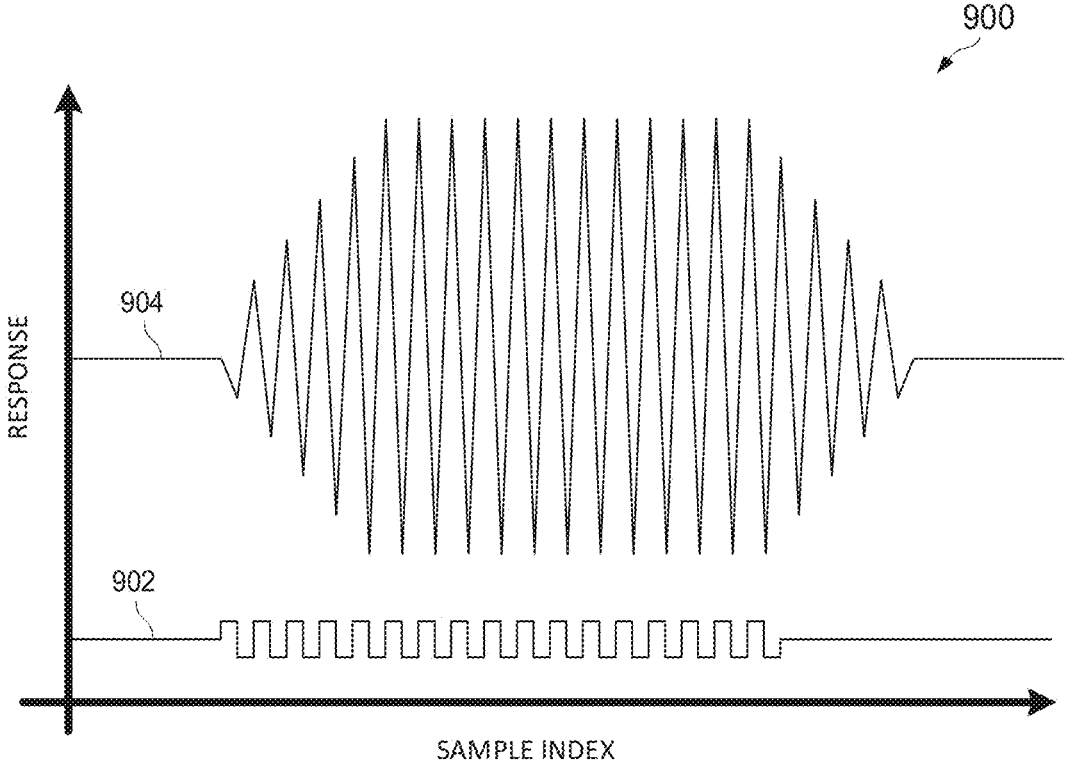
FIG. 9 is an embodiment waveform diagram.

FIG. 9 illustrates an embodiment waveform diagram 900 depicting the signal transformation from the output of the slicer 702 to the output of the correlator circuit 704. FIG. 9 includes an input signal 902 representing the output of the slicer 702 and a correlator response signal 904 representing the output of the correlator circuit 704. The two waveforms have different offsets and scale factors to avoid overlapping, thus improving their observability in the figure.

The input signal 902 corresponds to the normalized square wave output from the slicer 702, generated from the ASK-modulated preamble sequence. The input signal 902 maintains a constant amplitude, reflecting the slicer's normalization of the incoming signal to the configured ASK amplitude.

The correlator response signal 904 represents the output of the correlator circuit 704, exhibiting a pattern of increasing amplitude triangular waves. The correlator circuit 704 increases its output value each time it detects a '1' bit in the input signal 902. The cumulative increase of the amplitude continues as long as consecutive '1' bits, characteristic of the preamble sequence, are received.

The triangular wave pattern of the correlator response signal 904 results from the matched filter implementation in the correlator circuit 704. When at least one biphase-mark '1' bit matches the filter in the correlator circuit 704, a triangular peak is observed in the correlator response signal 904. The number of samples per bit (n) determines the width of each triangle. The amplitude of these triangular waves increases with each consecutive '1' bit, reaching its maximum when the number of consecutive '1' bits matches the configured number of correlated preamble bits ($N_{BIT\ PREAMBLE}$ is equal to five in the example of FIG. 9).

FIG. 9 demonstrates how the correlator circuit 704 can enhance the preamble sequence detection. While the input signal 902 can be affected by unwanted fluctuations due to noise in the proximity of the hysteresis region of the slicer 702, the correlator response signal 904 shows distinguishable peaks that subsequent processing stages can easily detect. This increasing amplitude of the output of the correlator circuit 704 directly indicates the presence of consecutive '1' bits, which is the expected structure of the preamble.

The gradually increasing amplitude of the correlator response signal 904 allows for determining whether the proper number of sequential '1' bits has been received as the preamble signal. When the correlator output reaches its maximum amplitude, the complete expected number of correlated preamble bits ($N_{BIT\ PREAMBLE}$) has been matched. This method can enable preamble detection, as the response amplitude may cross a detection threshold before the entire correlated preamble bits ($N_{BIT\ PREAMBLE}$) have been matched, allowing for faster system response in identifying the start of a data transmission. On the other hand, if the correlator response signal 904 is provided to a variance estimator circuit 706, the variance response will show an analogous increasing trend due to the increasing amplitude of the correlator before achieving the horizontal asymptote.

Figure 10A:
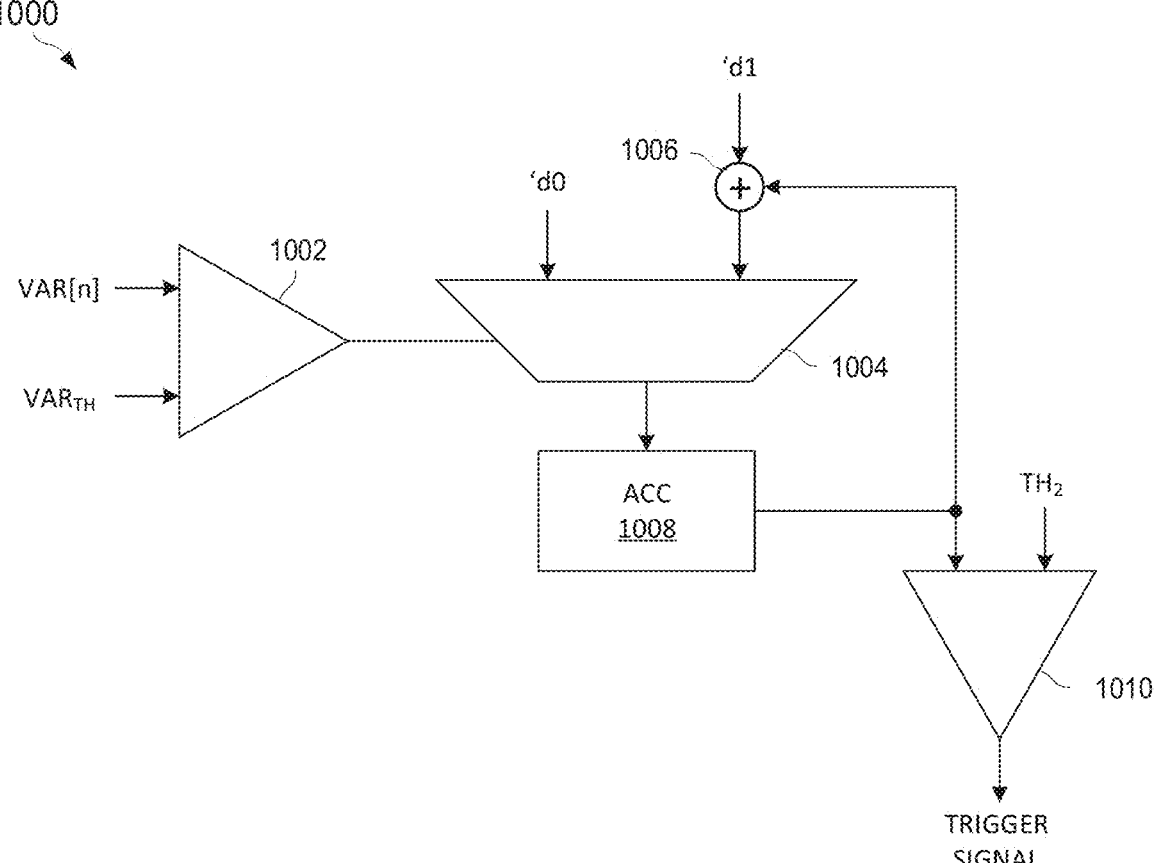
FIG. 10A is a block diagram of an embodiment decision logic circuit.

FIG. 10A illustrates a block diagram of an embodiment decision logic circuit 1000, which can be implemented as the decision logic circuit 708 of FIG. 7A. The circuit comprises a first comparator 1002, a multiplexer 1004, an adder 1006, an accumulator (ACC) 1008, and a second comparator 1010, which may (or may not) be arranged as shown. These components are arranged to process the variance estimator output and generate a trigger signal based on specific criteria. Decision logic circuit 1000 may include additional components not shown.

The first comparator 1002 receives the variance estimator output VAR[n] and compares it against a threshold value (VAR$_{TH}$). The output of this comparator feeds into the multiplexer 1004. When the variance estimator output exceeds the threshold, the comparator output selects the increment value ('d$_1$') through the multiplexer 1004. Otherwise, it selects the reset value ('d$_0$').

The adder 1006 combines the output of the multiplexer 1004 with the current value stored in the accumulator 1008. If the increment value is selected, the accumulator value increases, counting consecutive samples associated with the preamble '1' bits. If the reset value is selected, the accumulator 1008 resets to zero, restarting the count of consecutive samples.

The accumulator 1008 stores the running count of consecutive detected samples associated with preamble '1' bits. The count is compared against a second threshold value (TH$_2$) in the second comparator 1010. The second comparator 1010 determines if the number of consecutive samples associated with preamble '1' bits has reached the predetermined count required for a valid preamble in the ASK communication protocol.

If the accumulator value meets or exceeds the second threshold value (TH$_2$), indicating the required number of consecutive samples compatible with the '1' bits associated with a preamble has been detected, the second comparator 1010 outputs a trigger signal. The trigger signal can activate subsequent processing stages or indicate the detection of a valid preamble to other parts of the system.

The decision logic circuit 1000 thus implements a detection mechanism to identify a waveform compliant with the preamble format, including a specific number of consecutive biphase-mark '1' bits. By using the reset value to clear the count when a sample is incompatible with the expected stream and the increment value to count the samples associated with consecutive '1' bits, the circuit can accurately determine when a valid preamble has been received in the ASK communication system.

Figure 10B:
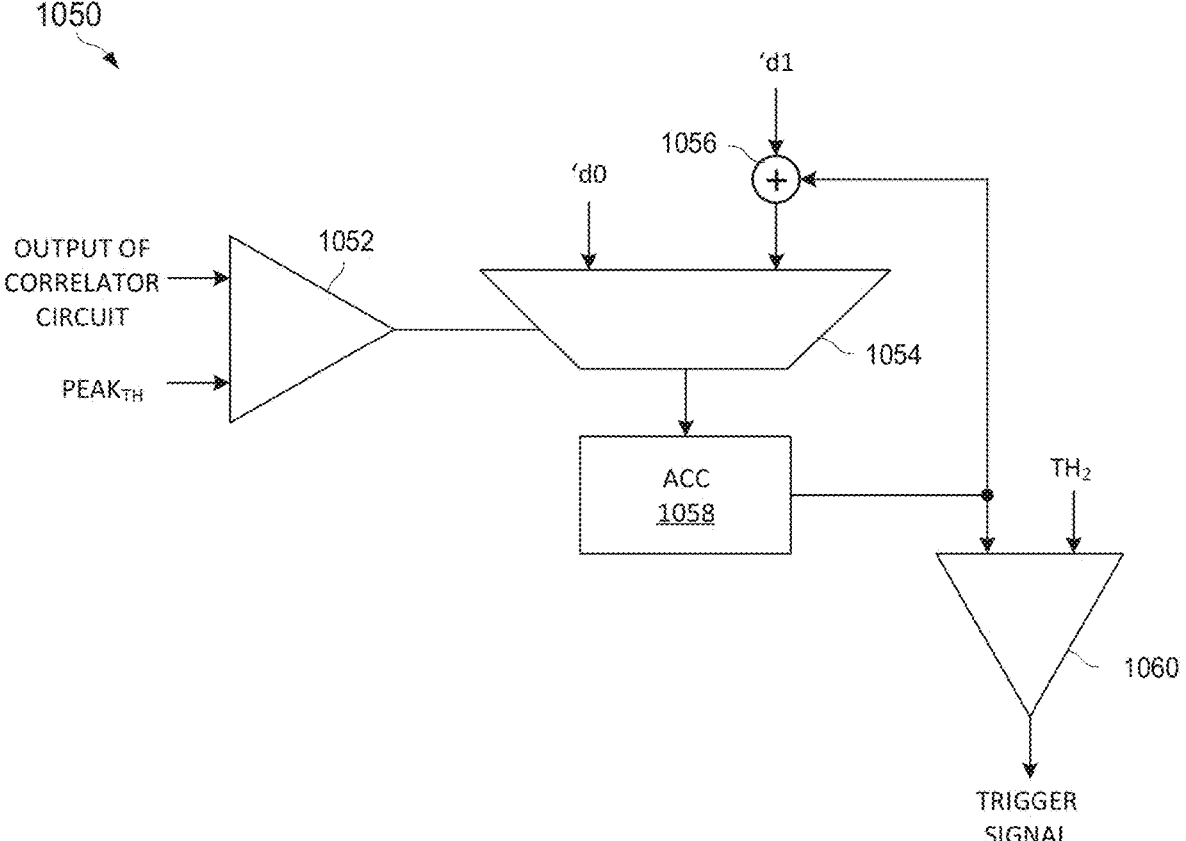
FIG. 10B is a block diagram of an embodiment decision logic circuit.

FIG. 10B illustrates a block diagram of an embodiment decision logic circuit 1050, which can be implemented as the decision logic circuit 708 of FIG. 7A. The circuit includes a first comparator 1052, a first multiplexer 1054, an adder 1056, an accumulator (ACC) 1058, and a second comparator 1060, which may (or may not) be arranged as shown. In this configuration, the variance estimator circuit is bypassed or eliminated, allowing the decision logic circuit 1050 to process the output of the correlator circuit directly. These components are arranged to process the output of the correlator circuit directly and generate a trigger signal based on specific criteria. Decision logic circuit 1050 may include additional components not shown.

The first comparator 1052 receives the output of the correlator circuit and compares it against a peak threshold value (PEAK$_{TH}$). This threshold can be set between the expected maximum values for N−1 symbols and N symbols inside the correlator, allowing for flexible pattern matching. The output of this comparator feeds into the first multiplexer 1054. When the correlator output exceeds the peak threshold, the comparator output selects the increment value ('d$_1$') through the first multiplexer 1054. Otherwise, it selects the reset value ('d$_0$').

The adder 1056 combines the output of the first multiplexer 1054 with the current value stored in the accumulator 1058. If the increment value ('d$_1$') is selected (when a peak is detected), the accumulator value increases, counting the number of detected peaks associated with the preamble. If the reset value ('d$_0$') is selected (when no peak is detected), the accumulator 1058 resets to zero, restarting the count of detected peaks.

The accumulator 1058 stores the running count of detected peaks associated with the preamble. This count effectively represents the number of times the threshold has been exceeded, which correlates to the number of symbols matched. The count is compared against a second threshold value (TH$_2$) in the second comparator 1060. The second comparator 1060 determines if the number of detected peaks has reached the predetermined count required for a valid preamble in the ASK communication protocol.

If the accumulator value meets or exceeds the second threshold value (TH$_2$), indicating the required number of peaks associated with a preamble has been detected, the second comparator 1060 outputs a trigger signal. The trigger signal can activate subsequent processing stages or indicate the detection of a valid preamble to other parts of the system.

The decision logic circuit 1050 thus implements a detection mechanism to identify a preamble by counting the number of peaks in the correlator output that exceeds a certain threshold. This approach allows for flexible pattern matching.

For example, if the threshold is exceeded once, it indicates N symbols have been matched; if exceeded twice, N+1 symbols have been matched, and so on. A correlator operating on N+M−1 symbols with a single higher threshold crossing can provide the same information as a correlator on N symbols with M threshold crossings. This flexibility allows the circuit to use the same decision logic for various correlation strategies, such as using a longer correlation (e.g., 7 bits/symbols) with a single threshold crossing to achieve the same result as a shorter correlation (e.g., 5 bits/symbols) with multiple threshold crossings.

Figure 10C:
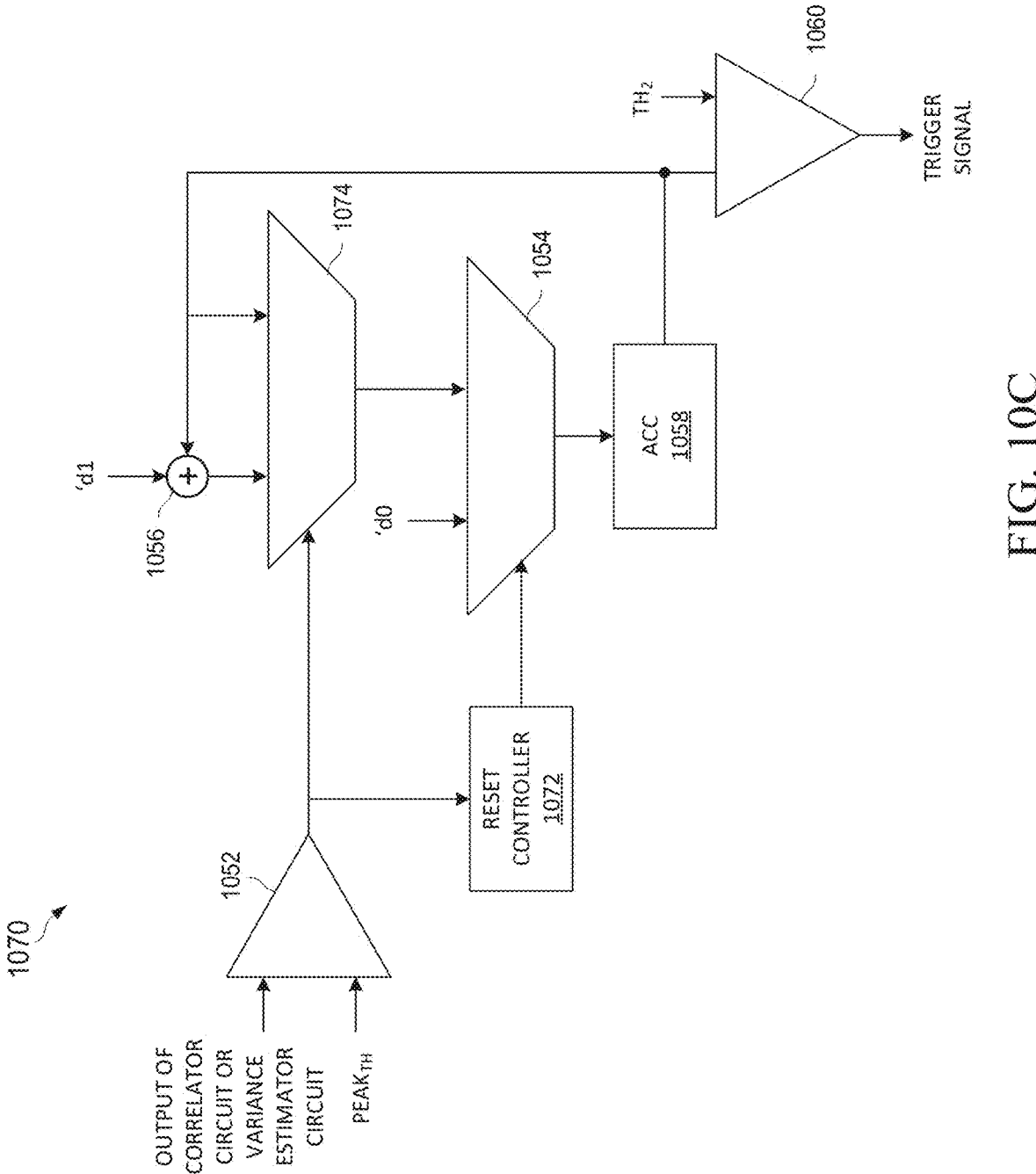
FIG. 10C is a block diagram of an embodiment decision logic circuit.

FIG. 10C illustrates a block diagram of an embodiment decision logic circuit 1070, which can be implemented as the decision logic circuit 708 of FIG. 7. The decision logic circuit 1070 provides a unified architecture capable of handling multiple detection scenarios through different input configurations.

The decision logic circuit 1070 includes the first comparator 1052, the first multiplexer 1054, the adder 1056, the accumulator (ACC) 1058, the second comparator 1060, a reset controller 1072, and a second multiplexer 1074, which may (or may not) be arranged as shown.

In embodiments, the first comparator 1052 can receive input directly from the correlator circuit 704, the peak detector circuit 752, or the variance estimator circuit 706. A threshold value (PEAK$_{TH}$) is applied to the first comparator 1052, with the specific threshold value configured based on the input source.

The second multiplexer 1074 handles the increment value ('d$_1$') and feedback path from the accumulator 1058. Together with the first multiplexer 1054, the flow of data to the adder 1056 is controlled based on the comparison results from the first comparator 1052 and reset conditions from the reset controller 1072.

The reset controller 1072 manages the behavior of the first multiplexer 1054 based on the employed detection strategy.

In the first mode, the reset controller 1072 resets the output of first multiplexer 1054 when a sample falls below the threshold. In an alternative mode, the reset controller 1072 forwards the output of the second multiplexer 1074 when samples fall below the threshold, thus keeping the accumulator value and allowing count to continue from its current value when new over-threshold samples arrive. In this mode, reset can be triggered by external events, such as timeout conditions occurring when no threshold crossings are detected for a predetermined number of consecutive input samples.

The accumulator 1058 maintains a count of qualified samples based on the output of the first comparator 1052 and the behavior of the reset controller 1072. The second comparator 1060 compares the accumulated count against a second threshold value (TH$_2$) to determine if sufficient evidence of a valid preamble has been detected. When the accumulated count meets or exceeds the second threshold value, the second comparator 1060 generates a trigger signal.

The unified architecture enables the decision logic circuit 1070 to support multiple detection strategies while maintaining consistent trigger generation behavior across input configurations and reset control schemes.

Figure 11:
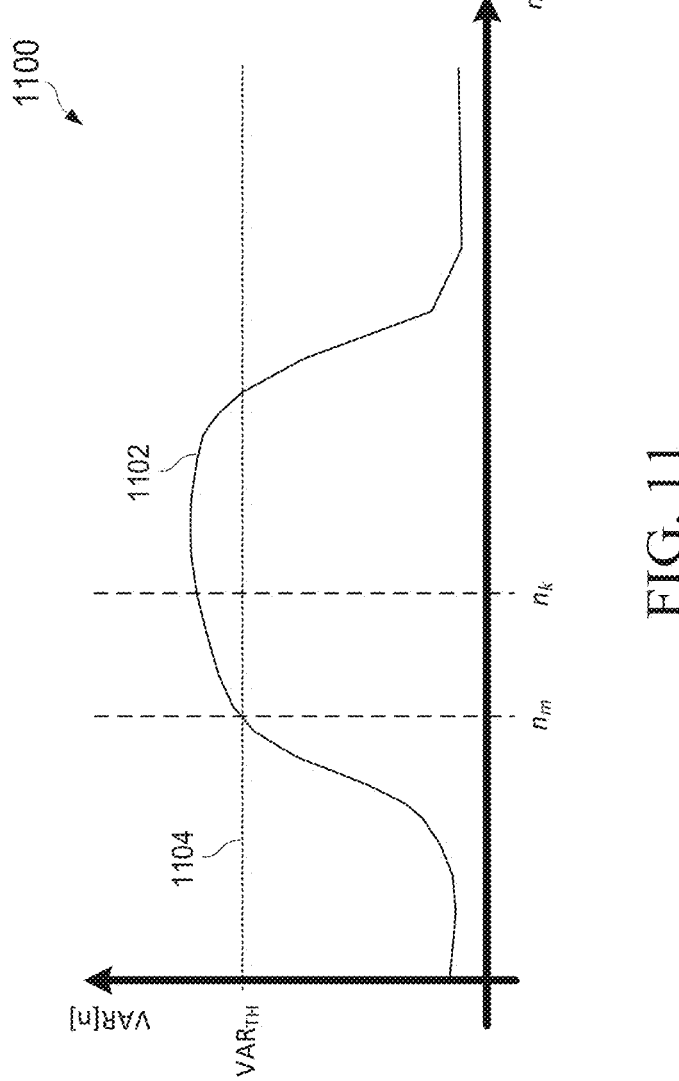
FIG. 11 is an embodiment timing diagram depicting the operation of a decision logic circuit.

FIG. 11 illustrates an embodiment timing diagram 1100 depicting the operation of the decision logic circuit 1000. The diagram includes a variance estimator output signal (VAR[n]) 1102, representing the variance estimator output (VAR[n]) over time, and the first threshold value (VAR$_{TH}$) 1104. Two significant time points (n$_m$ and n$_k$) are indicated by vertical dashed lines.

The variance estimator output signal (VAR[n]) 1102 corresponds to the input of the decision logic circuit 1000. The signal reflects the estimation of the correlated ASK signal, as processed by the variance estimator circuit 706. The waveform exhibits variations over time, with notable increases corresponding to potential preamble detections.

The first threshold value (VAR$_{TH}$) 1104 is represented by a horizontal line on the diagram. This value corresponds to the first threshold value (VAR$_{TH}$) input of the first comparator 1002 in the decision logic circuit 1000. It is the decision boundary for determining when the variance estimator output is sufficiently high to indicate a potential preamble.

Initially, the variance estimator output signal (VAR[n]) 1102 remains low, indicating a preamble signal's absence. As the preamble sequence begins, the variance estimator output signal (VAR[n]) 1102 rises, demonstrating an increase in the variance estimate as consecutive '1' bits are detected.

The rising portion of the variance estimator output signal (VAR[n]) 1102 crosses the first threshold value (VAR$_{TH}$) 1104 at time point n$_m$. The crossing triggers the decision logic circuit 1000 to begin counting consecutive samples above the first threshold value (VAR$_{TH}$). The time interval between n$_m$ and n$_k$ represents the period during which the circuit accumulates consecutive samples above threshold and after which the trigger is asserted.

After crossing the threshold, the variance estimator output signal (VAR[n]) 1102 rises and reaches a peak (as shown in FIG. 11) or a horizontal asymptote, representing the maximum variance estimate during the preamble sequence. At time point n$_k$, the circuit recognizes a valid preamble based on the accumulated consecutive samples above the threshold. Observing a peak or an asymptote depends on the transient properties of the correlator, and the filter computes the variance. If all transients end before the end of the preamble, the asymptote will be observed. Otherwise, a peak will be observed.

Following the peak, the variance estimator output signal (VAR[n]) 1102 descends, eventually falling below the first threshold value (VAR$_{TH}$) 1104. The descent indicates the end of the preamble sequence and the beginning of the actual data transmission.

The timing diagram 1100 effectively demonstrates how the decision logic circuit 1000 can identify a preamble sequence by monitoring the variance estimator output relative to a set threshold. The period during which the variance estimator output signal (VAR[n]) 1102 remains above the first threshold value (VAR$_{TH}$) 1104 can be used to determine if the required number of consecutive '1' bits has been received to constitute a valid preamble.

Figure 12:
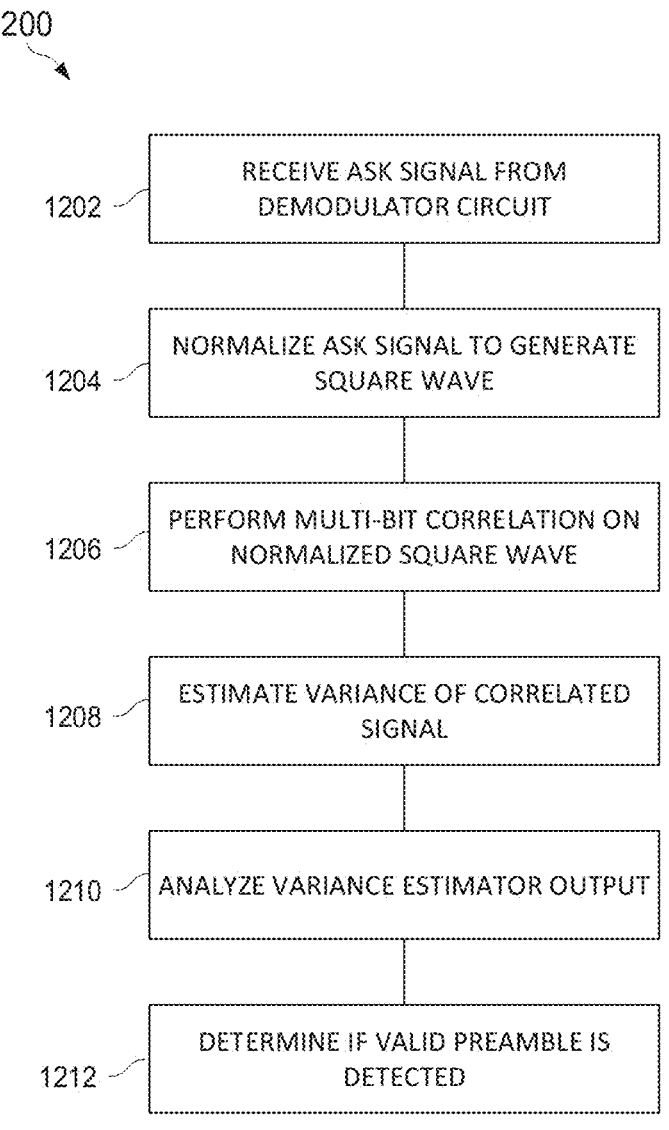
FIG. 12 is a flowchart of an embodiment method.

FIG. 12 illustrates a flowchart of an embodiment method 1200 for processing an amplitude-shift keying (ASK) signal to detect a preamble sequence. Method 1200 can be implemented in the detection circuit 604. It is noted that the steps outlined in the flow chart of the method, apart from the highest and the lowest, are not necessarily required, can be optional and depend on the available circuitry. Further, changes to the arrangement of the steps, removal of one or more steps and path connections, and addition of steps and path connections are similarly contemplated. In any case, the highest and the lowest steps in method 1200 are expected to be the first and the last steps.

Method 1200 can allow for efficient preamble detection in ASK communication systems. It can potentially reduce power consumption by keeping a primary demodulation circuit in a low-power state until a valid preamble is detected.

At step 1202, a preamble detection circuit (e.g., detection circuit 604) receives an ASK signal from a demodulator circuit (e.g., auxiliary demodulation circuit 602 or the primary demodulation circuit 606). The ASK signal can be a demodulated signal without a DC component, and the number of samples per bit (n) is known.

At step 1204, a slicer normalizes the ASK signal to generate a square wave with a configurable ASK amplitude (A$_{ASK}$). The slicer can include a comparator that controls the output value based on configurable threshold levels (±TH) and configurable amplitude levels (±A$_{ASK}$ in a bipolar output waveform scenario, zero and A$_{ASK}$ in a unipolar output waveform scenario).

At step 1206, a correlator circuit of the preamble detection circuit performs a single-bit or multi-bit correlation on the normalized square wave. The correlator circuit can implement a finite impulse response (FIR) matched filter, matched on a sequence of binary ones in the biphase-mark encoding. Each preamble bit can include a configurable number of samples (n).

At step 1208, a variance estimator circuit of the preamble detection circuit estimates the variance of the correlated signal. The variance estimator circuit can implement an exponential variance operator to calculate the square of the RMS value of the signal.

At step 1210, a decision logic circuit of the preamble detection circuit analyzes the output of the variance estimator circuit to determine if a valid preamble has been detected. The decision logic circuit can compare the variance estimator output to a threshold value and count consecutive samples exceeding this threshold.

At step 1212, if the decision logic circuit determines that a valid preamble has been detected, it can generate a trigger signal. The trigger signal can activate subsequent processing stages or indicate the detection of a valid preamble to other parts of the system.

Various parameters can be configurable, allowing the system to adapt to different operating conditions. For example, the ASK amplitude (A$_{ASK}$), the number of correlated preamble bits, the threshold values, and the number of consecutive samples required for preamble detection can all be adjusted based on system requirements.

Method 1200 can exploit the predictable nature of the signal responses at different stages of the detection process. By knowing the expected waveforms and amplitudes at the output of the slicer, the correlator circuit, and the variance estimator circuit, the decision logic circuit can make more accurate determinations about the presence of a valid preamble.

The proposed approach to preamble detection can be particularly useful in wireless power transfer systems compliant with standards such as Qi, where ASK modulation is used for communication between the power receiver and power transmitter. Method 1200 can provide a balance between reliable preamble detection and power efficiency, potentially improving the overall performance of the wireless power transfer system.

A first aspect relates to a method for detecting a preamble in an Amplitude Shift Keying (ASK) signal, the method comprising receiving a demodulated ASK signal at a preamble detection circuit; detecting a valid preamble or portions of a valid preamble sequence using the preamble detection circuit, the detecting comprising normalizing the demodulated ASK signal to generate a binary waveform with a configurable amplitude, performing a correlation between the normalized binary waveform and a reference preamble sequence, wherein the correlation is performed for a configurable number of bits, estimating a parameter associated with the correlated signal, and determining whether a valid preamble has been detected based on the estimated parameter; generating a trigger signal based on the detection of the valid preamble or portions of the valid preamble sequence.

In a first implementation form of the method, according to the first aspect as such, normalizing the demodulated ASK signal comprises comparing the demodulated ASK signal to configurable threshold levels; and outputting the binary waveform with configurable amplitude levels based on the comparison.

In a second implementation form of the method, according to the first aspect as such or any preceding implementation form of the first aspect, performing the correlation comprises performing a finite impulse response (FIR) matched filter on a sequence of preamble bits.

In a third implementation form of the method, according to the first aspect as such or any preceding implementation form of the first aspect, the reference preamble sequence comprises a configurable number of samples per preamble bit.

In a fourth implementation form of the method, according to the first aspect as such or any preceding implementation form of the first aspect, determining whether a valid preamble or portions of a valid preamble sequence has been detected comprises analyzing an output of the correlation, the analyzing comprising counting peaks in the output of the correlation that exceed a threshold value, and determining that a valid preamble has been detected in response to a number of counted peaks reaching a predetermined count.

In a fifth implementation form of the method, according to the first aspect as such or any preceding implementation form of the first aspect, determining whether a valid preamble or portions of a valid preamble sequence has been detected comprises comparing the estimated parameter to a threshold value; and determining whether the estimated parameter exceeds the threshold value.

In a sixth implementation form of the method, according to the first aspect as such or any preceding implementation form of the first aspect, the method further comprising generating the trigger signal in response to the estimated parameter exceeding the threshold value.

A second aspect relates to a circuit for detecting a preamble in an Amplitude Shift Keying (ASK) signal, the circuit comprising a slicer configured to normalize a demodulated ASK signal and generate a binary waveform with a configurable amplitude; a correlator circuit coupled to the slicer and configured to perform a correlation between the normalized binary waveform and a reference preamble sequence, wherein the correlation is performed for a configurable number of bits; an estimator circuit coupled to the correlator circuit and configured to estimate a parameter associated with the correlated signal; and a decision logic circuit coupled to the estimator circuit and configured to determine whether a valid preamble or portions of a valid preamble sequence has been detected based on the estimated parameter and generate a trigger signal in response to determining the valid preamble or portions of valid preamble sequence.

In a first implementation form of the circuit, according to the second aspect as such the slicer comprises a comparator configured to compare the demodulated ASK signal to configurable threshold levels and output the binary waveform with configurable amplitude levels based on the comparison.

In a second implementation form of the circuit, according to the second aspect as such or any preceding implementation form of the second aspect, the correlator circuit comprises a finite impulse response filter (FIR) matched to a sequence of preamble bits.

In a third implementation form of the circuit, according to the second aspect as such or any preceding implementation form of the second aspect, the reference preamble sequence comprises a configurable number of samples per preamble bit.

In a fourth implementation form of the circuit, according to the second aspect as such or any preceding implementation form of the second aspect, the estimator circuit includes a bypass mode, wherein, in response to the estimator circuit being in the bypass mode, the decision logic circuit is configured to analyze an output of the correlator circuit, the analyzing comprising counting samples in the output of the correlator circuit exceeding a threshold value, and determining that a valid preamble has been detected in response to a number of counted over-threshold samples reaching a predetermined count.

In a fifth implementation form of the circuit, according to the second aspect as such or any preceding implementation form of the second aspect, the decision logic circuit comprises a first comparator configured to compare the estimated parameter to a threshold value; and a second comparator configured to determine whether the estimated parameter exceeds the threshold value for a predetermined number of consecutive occurrences.

In a sixth implementation form of the circuit, according to the second aspect as such or any preceding implementation form of the second aspect, the decision logic circuit is further configured to generate the trigger signal in response to the estimated parameter exceeding the threshold value.

A third aspect relates to a system for Amplitude Shift Keying (ASK) demodulation, the system comprising a primary demodulation chain; and a preamble detection circuit coupled to the primary demodulation chain, the preamble detection circuit comprising a slicer configured to normalize a demodulated ASK signal and generate a binary waveform with a configurable amplitude, a correlator circuit coupled to the slicer and configured to perform a correlation between the normalized binary waveform and a reference preamble sequence, wherein the correlation is performed for a configurable number of bits, an estimator circuit coupled to the correlator circuit and configured to estimate a parameter associated with the correlated signal, and a decision logic circuit coupled to the estimator circuit and configured to determine whether a valid preamble or portions of a valid preamble sequence have been detected based on the estimated parameter, wherein the primary demodulation chain is triggered in response to detecting a valid preamble.

In a first implementation form of the system, according to the third aspect as such, the primary demodulation circuit comprises a demodulation sub-portion and a decoding sub-portion, the demodulation sub-portion configured to operate in a low-power mode while the decoding sub-portion remains inactive until a valid preamble is detected.

In a second implementation form of the system, according to the third aspect as such or any preceding implementation form of the third aspect, the system further comprising an auxiliary demodulation circuit configured to consume less power than the primary demodulation chain when performing demodulation; generate a signal for the preamble detection circuit; and maintain operation while the primary demodulation chain remains inactive.

In a third implementation form of the system, according to the third aspect as such or any preceding implementation form of the third aspect, the preamble detection circuit is configured to detect a preamble compliant with the ASK communication of Qi wireless power transfer standard.

In a fourth implementation form of the system, according to the third aspect as such or any preceding implementation form of the third aspect, the system further comprising a microcontroller coupled to the preamble detection circuit and the primary demodulation chain, wherein the microcontroller is configured to receive a trigger signal from the preamble detection circuit to trigger the primary demodulation chain.

In a fifth implementation form of the system, according to the third aspect as such or any preceding implementation form of the third aspect, the primary demodulation chain and an auxiliary demodulation circuit are configured to share hardware components in a low-power mode, wherein the shared hardware components comprise components necessary for generating a signal for the preamble detection circuit.

A fourth aspect relates to a system for Amplitude Shift Keying (ASK) demodulation, the system comprising a primary demodulation circuit configured to perform demodulation and decoding operations; an auxiliary demodulation circuit configured to perform demodulation operations without decoding; and a preamble detection circuit coupled to the primary demodulation circuit and the auxiliary demodulation circuit, wherein the system is configurable to operate in a first mode wherein the primary demodulation circuit remains inactive and the auxiliary demodulation circuit performs demodulation operations and provides signals to the preamble detection circuit, and a second mode wherein a demodulation portion of the primary demodulation circuit operates in a low-power state while a decoding portion remains inactive, the demodulation portion providing signals to the preamble detection circuit without the auxiliary demodulation circuit.

In a first implementation form of the system, according to the fourth aspect as such, selection between the first mode and second mode is based on relative power consumption characteristics of the demodulation operations in the primary demodulation circuit.

In a second implementation form of the system, according to the fourth aspect as such or any preceding implementation form of the fourth aspect, in the second mode, the demodulation portion of the primary demodulation circuit comprises components for generating signals for the preamble detection circuit.

A fifth aspect relates to a circuit for wireless power transfer systems, the circuit comprising a demodulation circuit configured to perform ASK signal demodulation and decoding operations, the demodulation circuit having a low-power state and an active state; a preamble detection circuit coupled to receive an ASK signal, the preamble detection circuit comprising a slicer configured to normalize a demodulated ASK signal and generate a binary waveform with a configurable amplitude, a correlator circuit coupled to the slicer and configured to perform a correlation between the normalized binary waveform and a reference preamble sequence, a parameter estimator circuit coupled to the correlator circuit and configured to estimate a parameter associated with the correlated signal, and a decision logic circuit coupled to the parameter estimator circuit and configured to determine whether a valid preamble or portions of a valid preamble sequence has been detected based on the estimated parameter, wherein the preamble detection circuit is configured to operate concurrently with the primary demodulation circuit, maintain the primary demodulation circuit in the low-power state until a valid preamble is detected, and trigger transition of the primary demodulation circuit from the low-power state to the active state upon detection of the valid preamble.

In a first implementation form of the circuit, according to the fifth aspect as such, the preamble detection circuit is configured to provide debug information about the ASK signal demodulation; generate trigger signals for external circuit components; confirm initiation of communication sequences; and manage power consumption of the primary demodulation circuit by controlling transitions between the low-power state and the active state, or a combination thereof.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method for detecting a preamble in an Amplitude Shift Keying (ASK) signal, the method comprising:
receiving a demodulated ASK signal at a preamble detection circuit;
detecting a valid preamble or portions of a valid preamble sequence using the preamble detection circuit, the detecting comprising:
normalizing the demodulated ASK signal to generate a normalized binary waveform with a configurable amplitude,
performing a correlation between the normalized binary waveform and a reference preamble sequence to generate a correlated signal, wherein the correlation is performed for a configurable number of bits,
estimating a parameter associated with the correlated signal, and
determining whether the valid preamble has been detected based on the estimated parameter; and
generating a trigger signal based on the detection of the valid preamble or portions of the valid preamble sequence.

2. The method of claim 1, wherein the normalizing the demodulated ASK signal comprises:
comparing the demodulated ASK signal to configurable threshold levels; and
outputting the normalized binary waveform with configurable amplitude levels based on the comparison.

3. The method of claim 1, wherein the performing the correlation comprises performing a finite impulse response (FIR) matched filter on a sequence of preamble bits.

4. The method of claim 3, wherein the reference preamble sequence comprises a configurable number of samples per preamble bit.

5. The method of claim 1, wherein the determining whether the valid preamble or portions of the valid preamble sequence has been detected comprises analyzing an output of the correlation, the analyzing comprising:
counting peaks in the output of the correlation that exceed a threshold value, and
determining that the valid preamble has been detected in response to a number of counted peaks reaching a predetermined count.

6. The method of claim 1, wherein the determining whether the valid preamble or portions of the valid preamble sequence has been detected comprises:
comparing the estimated parameter to a threshold value; and
determining whether the estimated parameter exceeds the threshold value.

7. The method of claim 6, further comprising generating the trigger signal in response to the estimated parameter exceeding the threshold value.

8. A circuit for detecting a preamble in an Amplitude Shift Keying (ASK) signal, the circuit comprising:
a slicer configured to normalize a demodulated ASK signal and generate a normalized binary waveform with a configurable amplitude;
a correlator circuit coupled to the slicer and configured to perform a correlation between the normalized binary waveform and a reference preamble sequence to generate a correlated signal, wherein the correlation is performed for a configurable number of bits;

an estimator circuit coupled to the correlator circuit and configured to estimate a parameter associated with the correlated signal; and a decision logic circuit coupled to the estimator circuit and configured to determine whether a valid preamble or portions of a valid preamble sequence has been detected based on the estimated parameter and generate a trigger signal in response to determining the valid preamble or portions of the valid preamble sequence.

9. The circuit of claim 8, wherein the slicer comprises a comparator configured to compare the demodulated ASK signal to configurable threshold levels and output the normalized binary waveform with configurable amplitude levels based on the comparison.

10. The circuit of claim 8, wherein the correlator circuit comprises a finite impulse response filter (FIR) matched to a sequence of preamble bits.

11. The circuit of claim 10, wherein the reference preamble sequence comprises a configurable number of samples per preamble bit.

12. The circuit of claim 8, wherein the estimator circuit includes a bypass mode, wherein, in response to the estimator circuit being in the bypass mode, the decision logic circuit is configured to analyze an output of the correlator circuit, the analyzing comprising:

counting samples in the output of the correlator circuit exceeding a threshold value, and determining that the valid preamble has been detected in response to a number of counted over-threshold samples reaching a predetermined count.

13. The circuit of claim 8, wherein the decision logic circuit comprises:

a first comparator configured to compare the estimated parameter to a threshold value; and a second comparator configured to determine whether the estimated parameter exceeds the threshold value for a predetermined number of consecutive occurrences.

14. The circuit of claim 13, wherein the decision logic circuit is further configured to generate the trigger signal in response to the estimated parameter exceeding the threshold value.

15. A system for Amplitude Shift Keying (ASK) demodulation, the system comprising:

a primary demodulation chain; and a preamble detection circuit coupled to the primary demodulation chain, the preamble detection circuit comprising:

a slicer configured to normalize a demodulated ASK signal and generate a normalized binary waveform with a configurable amplitude, a correlator circuit coupled to the slicer and configured to perform a correlation between the normalized binary waveform and a reference preamble sequence to generate a correlated signal, wherein the correlation is performed for a configurable number of bits, an estimator circuit coupled to the correlator circuit and configured to estimate a parameter associated with the correlated signal, and a decision logic circuit coupled to the estimator circuit and configured to determine whether a valid preamble or portions of a valid preamble sequence have been detected based on the estimated parameter, wherein the primary demodulation chain is triggered in response to detecting the valid preamble.

16. The system of claim 15, wherein the primary demodulation chain comprises a demodulation sub-portion and a decoding sub-portion, the demodulation sub-portion configured to operate in a low-power mode while the decoding sub-portion remains inactive until the valid preamble is detected.

17. The system of claim 15, further comprising an auxiliary demodulation circuit configured to:

consume less power than the primary demodulation chain when performing demodulation;

generate a signal for the preamble detection circuit; and maintain operation while the primary demodulation chain remains inactive.

18. The system of claim 15, wherein the preamble detection circuit is configured to detect a preamble compliant with the ASK communication of Qi wireless power transfer standard.

19. The system of claim 15, further comprising a microcontroller coupled to the preamble detection circuit and the primary demodulation chain, wherein the microcontroller is configured to receive a trigger signal from the preamble detection circuit to trigger the primary demodulation chain.

20. The system of claim 15, wherein the primary demodulation chain and an auxiliary demodulation circuit are configured to share hardware components in a low-power mode, wherein the shared hardware components comprise components necessary for generating a signal for the preamble detection circuit.

* * * * *